(12) United States Patent
Loverich et al.

(10) Patent No.: US 11,841,452 B2
(45) Date of Patent: *Dec. 12, 2023

(54) IDENTIFYING AN ASSET SORT LOCATION

(71) Applicant: United Parcel Service of America, Inc., Atlanta, GA (US)

(72) Inventors: Scott Alan Loverich, Westwood, NJ (US); Ted Abebe, Jersey City, NJ (US); Lawrence A. Lagrosa, Piscataway, NJ (US); Richard Allen Kerslake, Norwood, NJ (US); Jonathan C. Gray, Bridgewater, NJ (US); Carl M. Skonberg, Wykoff, NJ (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,515

(22) Filed: Aug. 27, 2021

(65) Prior Publication Data

US 2022/0050166 A1 Feb. 17, 2022

Related U.S. Application Data

(63) Continuation of application No. 16/697,922, filed on Nov. 27, 2019, now Pat. No. 11,105,887, which is a
(Continued)

(51) Int. Cl.
*G01S 5/00* (2006.01)
*G01S 5/02* (2010.01)
(Continued)

(52) U.S. Cl.
CPC .............. *G01S 5/0284* (2013.01); *G01S 5/02* (2013.01); *G06K 7/10297* (2013.01);
(Continued)

(58) Field of Classification Search
CPC .... G01S 5/0284; G01S 5/0045; G01S 5/0018; G01S 5/0009; G01S 5/02; G01S 1/00;
(Continued)

(56) References Cited

U.S. PATENT DOCUMENTS

| 5,532,521 A | 7/1996 | Leininger |
| 5,892,441 A | 4/1999 | Woolley et al. |

(Continued)

FOREIGN PATENT DOCUMENTS

| CN | 101957924 A | 1/2011 |
| CN | 103324901 A | 9/2013 |

(Continued)

OTHER PUBLICATIONS

"A Truly Global Tracking System with True Security", All Set Wireless Tracking, Available online at: <http://www.allset.se/tracking/solutions/overview.asp>, Downloaded on Feb. 17, 2004, 1 page.

(Continued)

*Primary Examiner* — Chuong P Nguyen
(74) *Attorney, Agent, or Firm* — SHOOK, HARDY & BACON L.L.P.

(57) ABSTRACT

Systems and methods for facilitating the sorting of assets to sort locations. In various embodiments, a sort employee scans an asset indicia using a user device, which stores asset data corresponding to the stored asset. As the sort employee nears a sort location (e.g., a delivery vehicle) with the asset and the user device, the user device automatically communicates wirelessly with a sort location receiver to associate the asset data with data indicative of the sort location where the user deposits the asset. In various embodiments, a device may determine whether the user device is proximate the appropriate sort location for the item, and may generate an alert upon a determination that the user device is proximate an incorrect sort location.

20 Claims, 11 Drawing Sheets

Related U.S. Application Data continuation of application No. 15/390,109, filed on Dec. 23, 2016, now Pat. No. 10,495,723, which is a continuation-in-part of application No. 14/741,100, filed on Jun. 16, 2015, now Pat. No. 9,658,310.

(51) Int. Cl.
*G06Q 10/08* (2023.01)
*G06K 7/10* (2006.01)
*G06Q 10/0833* (2023.01)
*G06Q 10/0835* (2023.01)
*G06Q 10/0631* (2023.01)
*G06Q 10/087* (2023.01)
*B07C 7/00* (2006.01)

(52) U.S. Cl.
CPC ......... *G06Q 10/08* (2013.01); *G06Q 10/0833* (2013.01); *B07C 7/005* (2013.01); *G01S 5/0018* (2013.01); *G01S 5/0045* (2013.01); *G06Q 10/06313* (2013.01); *G06Q 10/087* (2013.01); *G06Q 10/0835* (2013.01)

(58) Field of Classification Search
CPC ....... G01S 1/02; G01S 1/68; G06Q 10/06313; G06Q 10/08; G06Q 10/0833; G06Q 10/0835; G06Q 10/087; G06K 7/10297; G06K 17/00222; G08B 13/1427; B07C 7/005
USPC .......................... 342/368, 386, 450, 451, 464
See application file for complete search history.

(56) References Cited

U.S. PATENT DOCUMENTS

| | | | |
|---|---|---|---|
| 5,908,283 | A | 6/1999 | Huang et al. |
| 6,211,781 | B1 | 4/2001 | Mcdonald |
| 6,246,882 | B1 | 6/2001 | Lachance |
| 6,370,446 | B1 | 4/2002 | Divine |
| 6,480,108 | B2 | 11/2002 | Mcdonald |
| 6,998,985 | B2 | 2/2006 | Reisman et al. |
| 7,044,387 | B2 | 5/2006 | Becker et al. |
| 7,063,256 | B2 | 6/2006 | Anderson et al. |
| 7,090,134 | B2 | 8/2006 | Ramsager |
| 7,123,149 | B2 | 10/2006 | Nowak et al. |
| 7,221,276 | B2 | 5/2007 | Olsen et al. |
| 7,272,172 | B2 | 9/2007 | Duvaut et al. |
| 7,273,172 | B2 | 9/2007 | Olsen et al. |
| RE40,073 | E | 2/2008 | Breed |
| 7,372,365 | B2 | 5/2008 | Jackson |
| 7,378,968 | B2* | 5/2008 | Wang .................... G01S 5/0018 340/8.1 |
| 7,397,376 | B2 | 7/2008 | Jam et al. |
| 7,474,212 | B2 | 1/2009 | Nakagawa et al. |
| 7,484,663 | B2 | 2/2009 | Olsen et al. |
| 7,649,467 | B2* | 1/2010 | Schimmer .......... A63B 71/0605 342/450 |
| 7,667,572 | B2 | 2/2010 | Husak et al. |
| 7,667,575 | B2 | 2/2010 | Husak et al. |
| 7,895,131 | B2 | 2/2011 | Kraft |
| 8,018,336 | B2 | 9/2011 | Huang et al. |
| 8,032,429 | B2 | 10/2011 | Shafer |
| 8,095,304 | B2 | 1/2012 | Blanton et al. |
| 8,234,996 | B2 | 8/2012 | Smith |
| 8,253,538 | B1* | 8/2012 | Chu .................... G06K 7/10475 340/8.1 |
| 8,269,629 | B2 | 9/2012 | Lyon et al. |
| 8,344,879 | B2 | 1/2013 | Harmon et al. |
| 8,576,095 | B2 | 11/2013 | Harmon et al. |
| 8,611,321 | B2 | 12/2013 | Herrala et al. |
| 8,866,607 | B2 | 10/2014 | Velusamy |
| 8,973,835 | B2 | 3/2015 | Salzman et al. |
| 9,084,076 | B2 | 7/2015 | Breed et al. |
| 9,119,169 | B2 | 8/2015 | Luo et al. |
| 9,156,628 | B2* | 10/2015 | Ragusa .................... B07C 7/005 |
| 9,218,586 | B2 | 12/2015 | Ozkan |
| 9,454,746 | B2 | 9/2016 | Ozkan |
| 9,619,617 | B2* | 4/2017 | Skirble .................. G06Q 10/087 |
| 9,658,310 | B2 | 5/2017 | Loverich et al. |
| 9,805,529 | B2 | 10/2017 | Skonberg et al. |
| 9,824,517 | B2 | 11/2017 | Skonberg et al. |
| 9,860,688 | B2 | 1/2018 | Kulkarni et al. |
| 9,953,289 | B2* | 4/2018 | Mulaosmanovic ......................... G06K 7/10376 |
| 10,126,403 | B2* | 11/2018 | Loverich ............ G06K 7/10297 |
| 10,535,169 | B2 | 1/2020 | Dotterweich et al. |
| 10,540,780 | B1* | 1/2020 | Cousins ................... G06T 7/70 |
| 10,783,682 | B2* | 9/2020 | Dotterweich ........ G06K 7/1413 |
| 11,408,965 | B2* | 8/2022 | Hewett ................ G01S 5/0221 |
| 2002/0154060 | A1 | 10/2002 | Smith |
| 2003/0003777 | A1 | 1/2003 | Lesesky et al. |
| 2003/0060938 | A1 | 3/2003 | Duvall |
| 2003/0120522 | A1 | 6/2003 | Uyeki |
| 2003/0190911 | A1 | 10/2003 | Hirano |
| 2003/0204407 | A1 | 10/2003 | Nabors et al. |
| 2004/0055345 | A1 | 3/2004 | Moore |
| 2004/0069850 | A1 | 4/2004 | De |
| 2004/0102896 | A1 | 5/2004 | Thayer et al. |
| 2004/0182925 | A1 | 9/2004 | Anderson et al. |
| 2004/0195320 | A1 | 10/2004 | Ramsager |
| 2005/0119786 | A1 | 6/2005 | Kadaba |
| 2005/0209947 | A1 | 9/2005 | Shafer |
| 2006/0022824 | A1 | 2/2006 | Olsen et al. |
| 2008/0198001 | A1 | 8/2008 | Sarma et al. |
| 2009/0085745 | A1 | 4/2009 | Gupta et al. |
| 2009/0091450 | A1 | 4/2009 | Deavila |
| 2009/0160646 | A1 | 6/2009 | Mackenzie et al. |
| 2009/0195384 | A1 | 8/2009 | Amidi |
| 2009/0198734 | A1* | 8/2009 | Tessier .................. G01S 5/0295 |
| 2011/0037573 | A1 | 2/2011 | Choi |
| 2011/0148625 | A1 | 6/2011 | Velusamy |
| 2011/0227722 | A1 | 9/2011 | Salvat, Jr. |
| 2011/0285535 | A1 | 11/2011 | Barwin |
| 2012/0127976 | A1 | 5/2012 | Lin et al. |
| 2012/0316964 | A1 | 12/2012 | Roumeliotis et al. |
| 2013/0063251 | A1 | 3/2013 | Allen |
| 2013/0098989 | A1 | 4/2013 | Salzman et al. |
| 2013/0099927 | A1 | 4/2013 | Kulinets et al. |
| 2013/0144429 | A1 | 6/2013 | Ragusa et al. |
| 2013/0169415 | A1* | 7/2013 | Bellows ................ G01S 5/0284 340/10.1 |
| 2014/0058886 | A1 | 2/2014 | Gopalakrishnan |
| 2014/0074667 | A1* | 3/2014 | Smith ..................... G01S 13/74 705/28 |
| 2014/0104036 | A1 | 4/2014 | Skonberg et al. |
| 2014/0209676 | A1 | 7/2014 | Reynolds et al. |
| 2015/0070165 | A1 | 3/2015 | East |
| 2015/0070191 | A1* | 3/2015 | Westick .................... H04Q 9/00 340/870.07 |
| 2015/0226832 | A1 | 8/2015 | Fujiwara |
| 2015/0262348 | A1 | 9/2015 | Salzman et al. |
| 2015/0278888 | A1 | 10/2015 | Lu et al. |
| 2016/0012263 | A1* | 1/2016 | Mally .................... G01S 5/0009 340/10.1 |
| 2016/0180289 | A1* | 6/2016 | Siris .................. G06Q 10/0833 702/150 |
| 2016/0307152 | A1 | 10/2016 | Baldassari et al. |
| 2016/0314429 | A1 | 10/2016 | Gillen et al. |
| 2016/0370452 | A1 | 12/2016 | Loverich et al. |
| 2016/0371638 | A1 | 12/2016 | Loverich et al. |
| 2016/0371646 | A1 | 12/2016 | Loverich et al. |
| 2016/0371647 | A1 | 12/2016 | Loverich et al. |
| 2017/0108577 | A1 | 4/2017 | Loverich et al. |
| 2018/0240064 | A1* | 8/2018 | Mulaosmanovic ......................... G06K 7/10376 |
| 2019/0051407 | A1* | 2/2019 | Van Der Veer ........ G16H 40/40 |
| 2020/0209342 | A1 | 7/2020 | Loverich et al. |

FOREIGN PATENT DOCUMENTS

| | | | |
|---|---|---|---|
| CN | 103824173 A | 5/2014 | |
| EP | 1182154 A1 | 2/2002 | |

(56) References Cited

FOREIGN PATENT DOCUMENTS

| | | |
|---|---|---|
| EP | 1688901 A1 | 8/2006 |
| JP | H01214504 A | 8/1989 |
| KR | 20090036292 A | 4/2009 |
| WO | 00/37958 A2 | 6/2000 |
| WO | 2004/079546 A2 | 9/2004 |
| WO | 2009/029594 A1 | 3/2009 |
| WO | 2013/072020 A3 | 7/2013 |
| WO | 2016/204840 A1 | 12/2016 |

OTHER PUBLICATIONS

"About Hi-G-Tek", Hi-G-Tek, Available online at: <http://www.higtek.com/company.htm>, Downloaded on Feb. 17, 2004, pp. 1-2.

"All Set System Installed Onboard RoRo Ship", All Set Wireless Tracking, Available online at: <http://www.allset.se/tracking/news/Articles/default.asp?articleID=19>, May 26, 2003, 1 page.

"All Set Tracking Launches a New Revolutionary Electronic Seal", All Set Marine Security, Available online at: <http://www.allset.se/security/news/Articles/default/.asp?articleID=14>, Sep. 17, 2002, 1 page.

Booton, Jennifer, "Saving Millions by Donning Smart Glasses at Work", FOXBusiness, Available online at: <https://www.foxbusiness.com/features/saving-millions-by-donning-smart-glasses-at-work>, Mar. 4, 2016, pp. 1-3.

"Cargo Container With Smart Systems Alerts Global Network in Real-Time About Security Breaches and in-the-Box Changes", Savi Technology, Available online at: <http://www.savi.com/news_events/2003releases/oct29-03.a.html>, Oct. 29, 2003, pp. 1-4.

"Cargo Security—Your Source for Supply Chain Cargo Security Products", CGM Security Solutions, Available online at: <http://www.cgmsecuritysolutions.com/sw/swchannel/homepage/internet/schomepage.asp?>, Downloaded on Feb. 17, 2004, pp. 1-2.

"CIMC and All Set in "Smart and Secure Container" Alliance", All Set Wireless Tracking, Available online at: <http://www.allset.se/tracking/news/Articles/default.asp?articleID=16>, Apr. 4, 2003, pp. 1-2.

"Elementary Solutions for a Moving World", All Set Wireless Tracking, Available online at: <http://www.allset.se/tracking/>, Downloaded on Feb. 17, 2004, 1 page.

"Freight Containers—Radio-Frequency Communication Protocol for Electronic Seal", ISO Document, Sep. 27, 2003, 23 pages.

"Hi-G-Tek Diamond are Forever", Hi-G-Tek, Available online at: <http://www.higtek.com/images/article.gif>, Downloaded on Feb. 17, 2004, 1 page.

Hickey, Kathleen, "Insecurity Over E-Seals", trafficWorld, Maritime, Jan. 19, 2004, p. 34.

"Keep Track of Your Containers", All Set Wireless Tracking, Available online at: <http://www.allset.se/tracking/solutions/scenarios.asp>, Downloaded on Feb. 17, 2004, pp. 1-3.

Matus, Morgana, "Ikea's Augmented Reality 2014 Catalog Lets You Preview Products in Your Apartment", Inhabitat, Available online at: <http://inhabitat.com/ikeas-augmented-reality-2014-catalog-lets-you-preview-products-in-your-apartment/>, Aug. 11, 2013, 8 pages.

Noll et al., "Markerless Camera Pose Estimation—An Overview", Visualization of Large and Unstructured Data Sets IRTG Workshop, 2010, Jan. 2010, pp. 45-54.

"Our Business", Welcome to Elogicity, Available online at: <http://www.elogicity.com/about_us.htm>, Downloaded on Feb. 17, 2004, 1 page.

"Our Products", CGM Security Solutions, Available online at: <http://www.cgmsecuritysolutions.com/sw/swchannel/productcatalogcf_v2/internet/Products>, Downloaded on Feb. 17, 2004, pp. 1-4.

"Perspective-n-Point", Wikipedia, Available online at: <https://en.wikipedia.org/wiki/Perspective-n-Point>, Retrieved on online Mar. 11, 2021, pp. 1-5.

SAPEnterpriseMobile, "SAP & Vuzix Bring you Augmented Reality Solutions for the Enterprise", YouTube, Available online at: <https://www.youtube.com/watch?v=9Wv9k_ssLcl>, May 12, 2013, pp. 1-2.

SAPEnterprisemobile, "SAP Mobile and Vuzix Showcase Augmented Reality Solutions for the Enterprise", YouTube, Available online at: <https://www.youtube.com/watch?v=mY3GCKMitjl>, May 28, 2013, pp. 1-2.

"Savi Solutions", Savi Technology, Securing the Smart Supply Chain, Available online at: <https://www.savi.com/solutions/index.html>, Downloaded on Feb. 17, 2004, 1 page.

"Savi Technology Launches SmartSeal™ Cargo Security System", Savi Technology, Securing the Smart Supply Chain, Available online at: <http://www.savi.com/news_events/2001releases/oct03-01.html>, Oct. 3, 2001, pp. 1-2.

Scott, Smith, "U.S. Treasury Advisory Committee on Commercial Operations of the United States Customs Service (COAC)" Subcommittee on US Border Security Technical Advisory Group & Customs Trade Partnership Against Terrorism (CTPAT), Report on Seal Technologies, vol. 7, Jun. 14, 2002, 36 pages.

"Search Savi", Savi Technology, Securing the Smart Supply Chain, Available online at: <http://www.savi.com/cgi-bin/sitesearch/search_savi.cgi>, Downloaded on Feb. 17, 2004, pp. 1-2.

"Secured Cargo", Hi-G-Tek, Available online at :<http://www.higtek.com/cargo.htm>, Downloaded on Feb. 17, 2004, pp. 1-4.

"Smartglasses", Wikipedia, Available online at: <https://en.wikipedia.org/wiki/Smartglasses>, Retrieved on online Mar. 11, 2021, pp. 1-14.

"Solutions", Welcome to Elogicity, Available online at :<http://www.elogicity.com/solutions.htm>, Downloaded on Feb. 17, 2004, 1 page.

"Warehouse Operations Committee", IARW, Jul. 27, 2003, 50 pages.

"We Make Electronic Sealing Easy and Economical", All Set Wireless Tracking, Available online at: <http://www.allset.se/tracking/solutions/products.asp>, Downloaded on Feb. 17, 2004, pp. 1-2.

* cited by examiner

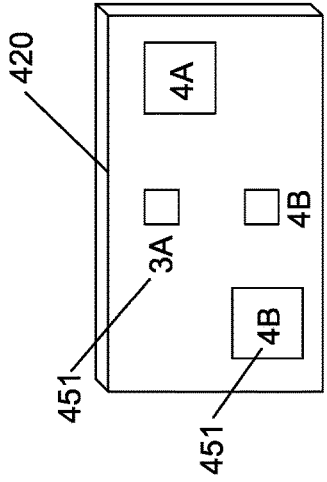
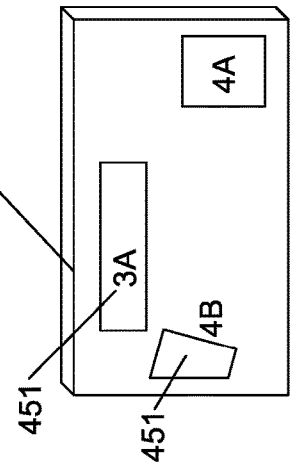
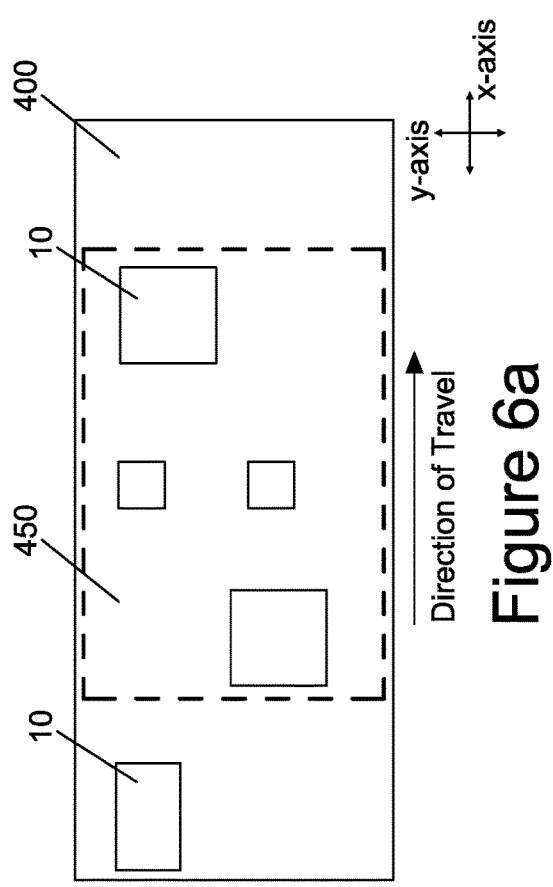
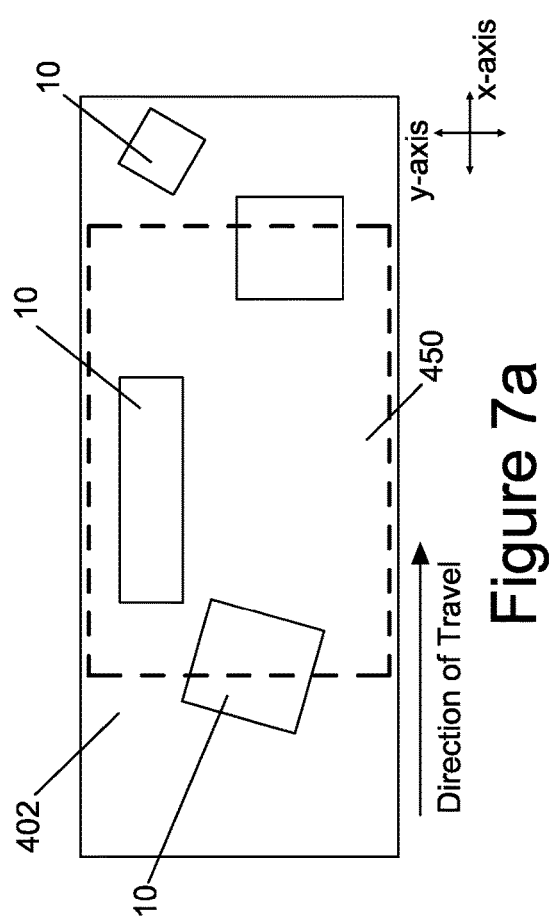

IDENTIFYING AN ASSET SORT LOCATION

CROSS-REFERENCE TO RELATED APPLICATIONS

The present application is a continuation of U.S. patent application Ser. No. 16/697,922 Filed on Nov. 27, 2019, which is a continuation of U.S. patent application Ser. No. 15/390,109 Filed on Dec. 23, 2016, which is a continuation in part of U.S. patent application Ser. No. 14/741,100, filed on Jun. 16, 2015, all of which are hereby incorporated by reference in their entireties.

BACKGROUND

For large scale common carriers, it is important to maintain accurate information regarding the location of various assets shipped from a variety of origins to a variety of destinations. The various assets often undergo multiple sort procedures, and are moved from one transportation vehicle to another as each asset moves closer to its intended destination.

The sort procedures often require many employees to sort assets arriving in several vehicles, and these assets may be placed in several locations corresponding to their next stop before reaching an intended destination. The employees may receive some indication of the proper sort location for each asset, such as text printed on each asset or instructions scrolling across a video screen. The employee may then place the asset in the proper sort location after receiving the indication of the proper sort location. In various circumstances, the employee may manually identify the location at which the asset is placed, and thereby maintain a record of the location of the asset throughout the shipping process.

However, historical concepts for identifying the location of an asset have been cumbersome, requiring sort employees to individually identify the sort location for each of a plurality of assets being sorted. For example, a sort employee may be required to scan indicia on each asset (e.g., a bar code) and subsequently scan a similar indicia on the sort location in order to associate the asset with the sort location. Alternatively, the sort employee may be required to first scan indicia on a sort location, and then scan a similar indicia on each of one or more assets to be associated with the single sort location. Regardless of the scan order (e.g., asset first or sort location first), the sort employee is required to scan a new sort location indicia each time an asset is to be sorted to a second sort location. Requiring employees to scan multiple indicia significantly reduces sorting efficiency and increases the possibility of employee error. Should an employee fail to scan the proper sort location indicia before placing an asset at a sort location, the asset location may be improperly stored, and such asset may be transported to an incorrect destination. Such events may additionally result in improper reporting from data storage devices.

Such historical systems and methods for maintaining accurate asset location information for a plurality of sorted assets are thus expensive to implement and do not eliminate possible sort errors. Thus, a need exists for an improved system and method for maintaining accurate records of the location of an asset in a sort process.

BRIEF SUMMARY

In one embodiment, a system for associating a sorted asset with a sort location includes one or more location devices associated with a sort location, where each of the one or more location devices includes one or more memory storage areas and one or more processors configured to store location data indicative of the identity of the sort location and transmit at least a portion of the location data, and a user device including one or memory storage areas and one or more processors, the user device configured to receive asset identifier data from an asset indicia, where the asset indicia is associated with an asset, store the asset identifier data corresponding to the asset, and upon being brought within a communication area associated with the sort location, receive the transmitted portion of the location data from the one or more location devices, after receiving the at least a portion of the location data transmitted from the one or more location devices, transmit the asset identifier data and the location data, and provide for display, an indication of an appropriate sort location based on the asset identifier data, where the indication of the appropriate sort location is superimposed over the asset in a display.

In another embodiment a system for associating a sorted asset with a sort location includes a user device including one or memory storage areas and one or more processors, the user device configured to receive asset identifier data from an asset indicia, where the asset indicia is associated with an asset, store the asset identifier data corresponding to the asset, provide for display, an indication of an appropriate sort location based on the asset identifier data, where the indication of the appropriate sort location is superimposed over the asset in a display, and upon being brought within a communication area associated with the sort location, transmitting at least a portion of the asset identifier data, one or more location devices associated with a sort location, where each of the one or more location devices include one or more memory storage areas and one or more processors configured to store location data indicative of the identity of the sort location, receive at least a portion of the asset identifier data transmitted from the user device, and after receiving at least a portion of the asset identifier data transmitted from the user device, associate the asset identifier data and the location data.

In yet another embodiment a computer-implemented method for associating a sorted asset with a sort location, the method including receiving, at a user device worn by a user, asset identifier data from an asset, storing at least a portion of the asset identifier data in a memory associated with the user device, providing for display at the user device, an indication of an appropriate sort location based on the asset identifier data, where the indication of the appropriate sort location is superimposed over the asset in a display, determining the location of the user device relative to one or more location devices associated with a sort location based on a wireless communication between the user device and at least one of the one or more location devices, and after determining that the user device is proximate the sort location based on the wireless communication between the user device and the at least one of the one or more location devices, associating the asset identifier data with sort location data corresponding to the sort location.

BRIEF DESCRIPTION OF THE SEVERAL VIEWS OF THE DRAWINGS

Reference will now be made to the accompanying drawings, which are not necessarily drawn to scale, and wherein:

FIG. 6a schematically depicts a work zone of FIG. 5 captured by an acquisition device according to one or more embodiments shown and described herein;

FIG. 6b schematically depicts an image of the work zone of FIG. 6a viewed on the display according to one or more embodiments shown and described herein;

FIG. 7a schematically depicts the work zone of FIG. 5 captured by an acquisition device according to one or more embodiments shown and described herein;

FIG. 7b schematically depicts an image of the work zone of FIG. 7a viewed on the display according to one or more embodiments shown and described herein;

DETAILED DESCRIPTION

Figure 1:
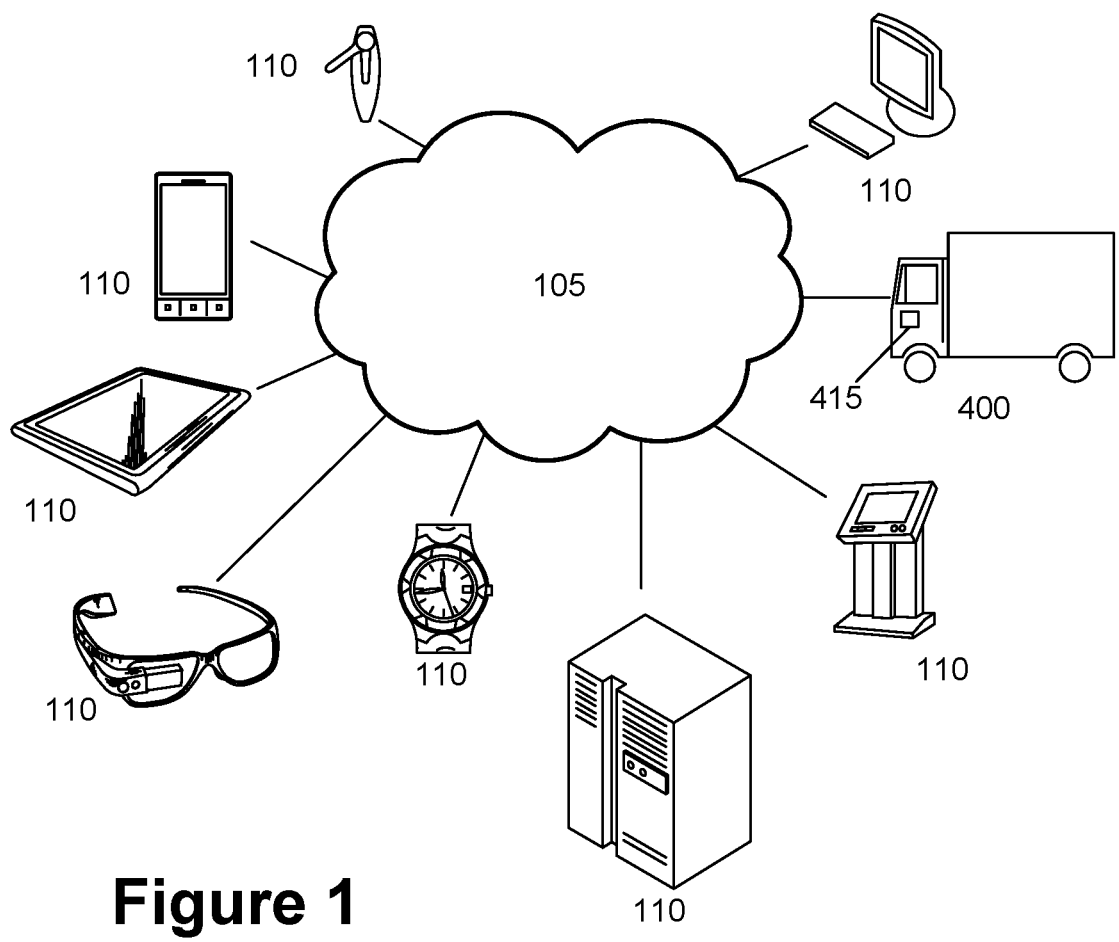
FIG. 1 schematically depicts a control system according to one or more embodiments shown and described herein.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

Various embodiments of the present invention are directed to systems and methods for associating an asset with a particular sort location. As used herein, an asset may be a parcel or group of parcels, a package or group of packages, a box, a crate, a drum, a box strapped to a pallet, and/or the like. As described herein, a sort employee may utilize a user device comprising an indicia reader (e.g., an RFID tag reader, optical scanner, and/or a plurality of indicia readers) to obtain data indicative of the asset identity. The sort employee may then transport the asset to a sort location identified for the asset (e.g., printed on the asset, displayed on a video screen, etc.). In various embodiments, the user device may display the proper sort location for the asset via a display on the user device. As the sort employee nears and/or enters a sort location (e.g., enters a delivery vehicle, container, or storage area) and thereby enters an effective transmission range of one or more wireless beacons associated with the sort location, the user device may receive a signal from the one or more of the wireless beacons indicating the identity of the sort location. In various embodiments the user device determines whether the received signal satisfies one or more signal criteria, such as a threshold strength requirement and/or whether the user device receives signals from at least a threshold number of beacons. Upon a determination that the user device is at least proximate the sort location associated with the received signals and the one or more signal criteria are satisfied, the user device transmits asset identity data and sort location identity data to a control system, which determines, based on stored sort data, whether the sort location is the appropriate sort location for the asset. If the control system determines the asset is proximate the appropriate sort location, the control system may cause confirmation data to be sent to the user device, which may display a confirmation message to the sort employee. Alternatively, if the control system determines the asset is being placed in an incorrect sort location, the control system may cause mistake data to be sent to the user device, which may display a mistake message indicating the asset is being placed in an improper sort location.

In various embodiments, as the sort employee nears a sort location (e.g., a delivery vehicle, container, or storage area) the user device may transmit the received and stored data to a receiver associated with the nearby sort location. If the receiver associated with the sort location determines the asset is being placed in the appropriate sort location (e.g., based at least in part on data stored by a control system), the receiver may cause confirmation data to be sent to the user device, which may display a confirmation message to the sort employee. Alternatively, if the receiver associated with the sort location determines the asset is being placed in an incorrect sort location, the receiver may cause mistake data to be sent to the user device, which may display a mistake message indicating the asset is being placed in an improper sort location.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Generally, embodiments of the present invention relate to concepts for identifying an appropriate sort location for an asset, and for facilitating the appropriate sorting of each asset. For example, embodiments of the present invention may be used to notify sort personnel of the appropriate sort location for an asset. FIG. 1 is a schematic diagram showing the exemplary communication relationships between components of various embodiments of the present invention. As shown in FIG. 1, the system may include one or more control systems 100, one or more user devices 110, one or more location devices 415 associated with a sort location 400, and one or more networks 105. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

A. Exemplary Control System

Figure 2:
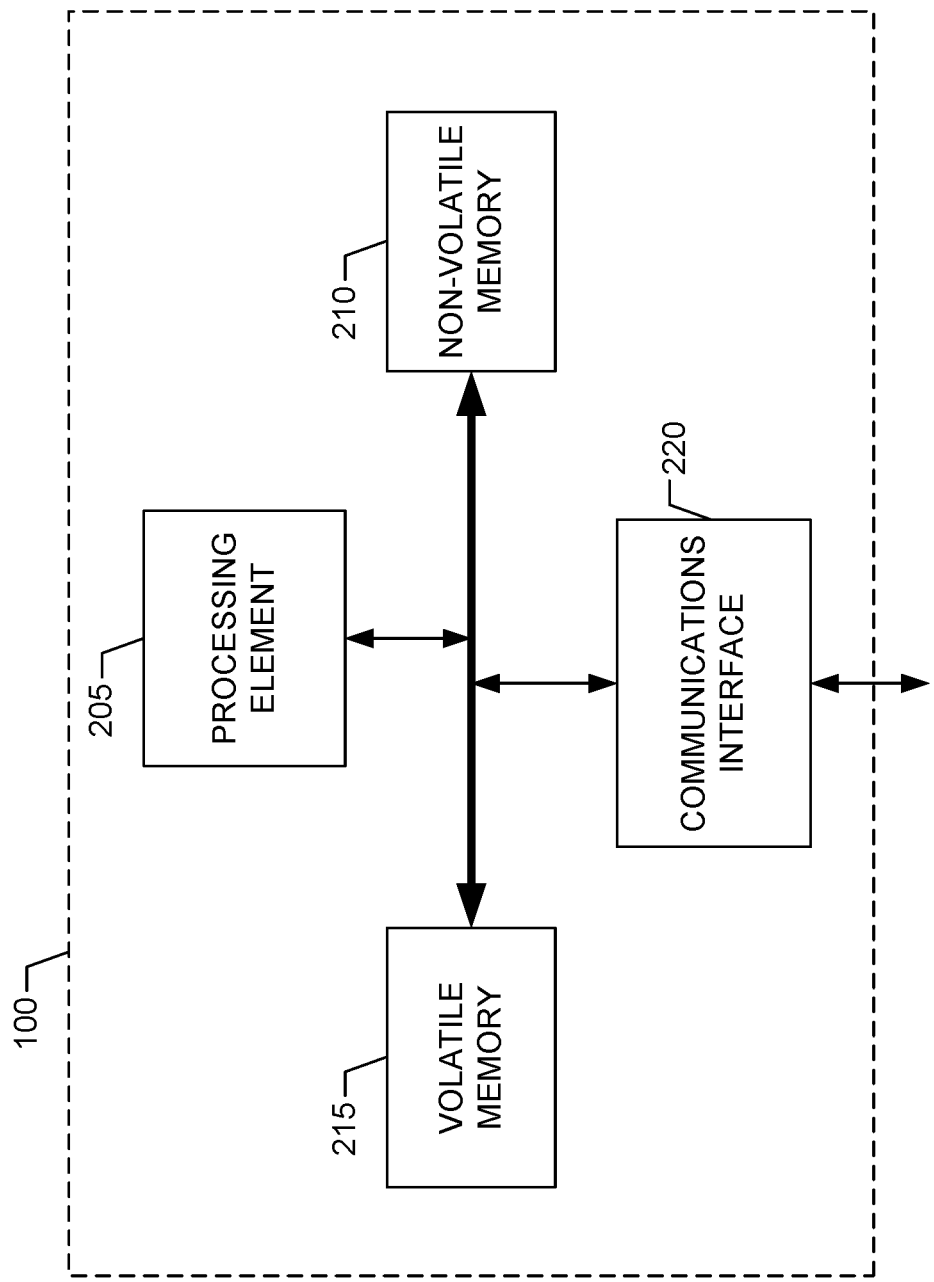
FIG. 2 schematically depicts the control system shown in FIG. 1 according to one or more embodiments shown and described herein.
Figure 5:
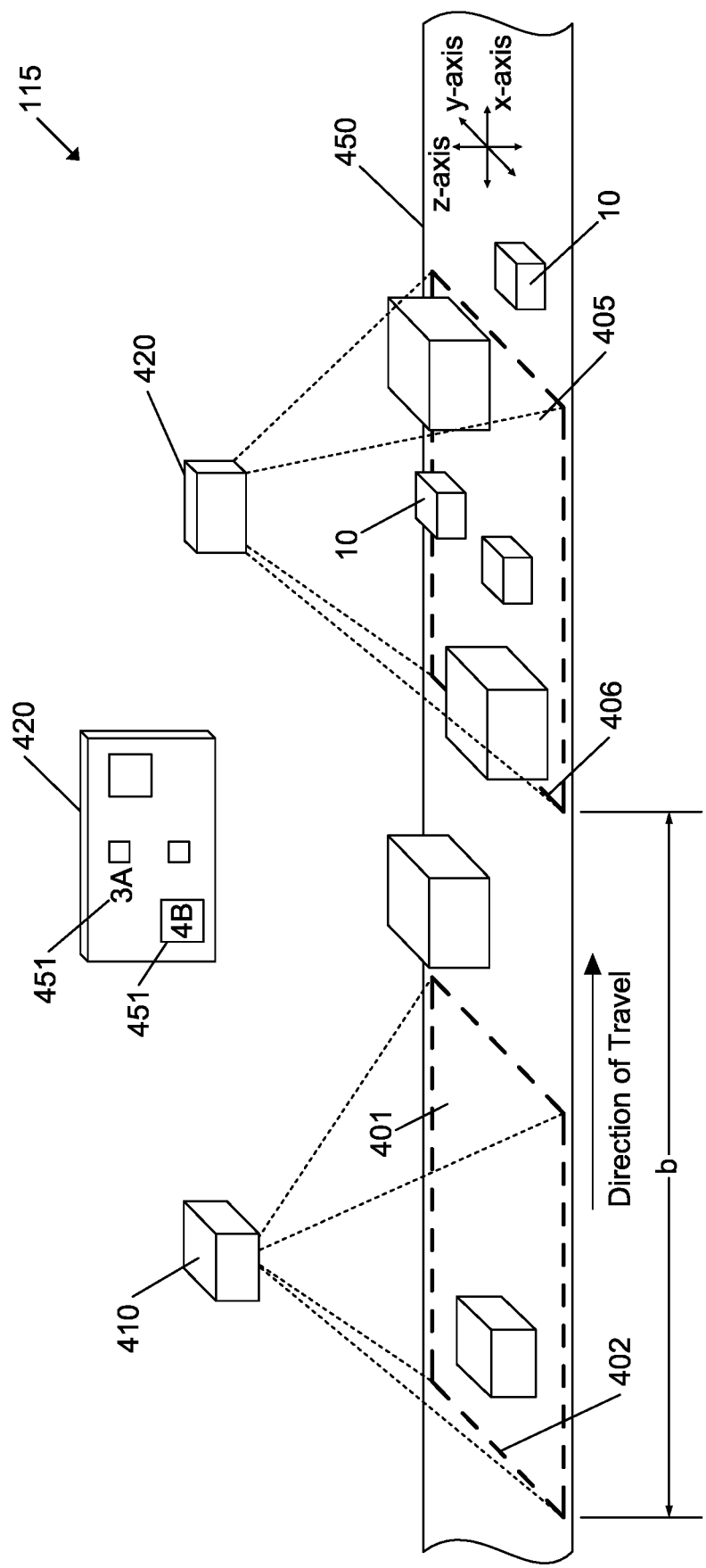
FIG. 5 schematically depicts a display in communication with the control system of FIG. 1 according to one or more embodiments shown and described herein.

FIG. 2 provides a schematic of a control system 100 according to one embodiment of the present invention. As described above, the control system 100 may be incorporated into a system as one or more components for providing information regarding the appropriate sort location for each of one or more assets 10 (FIG. 5). In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The control system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the control system 100 may include or be in communication with one or more processing elements 205 (also referred to as processors, processing circuitry, and/or similar terms used herein interchangeably) that communicate with other elements within the control system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the control system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, an acquisition module, a sort location module, a matching module, and a notification module. The terms database, database instance, database management system, and/or similar terms used herein interchangeably may refer to a structured collection of records or data that is stored in a computer-readable storage medium, such as via a relational database, hierarchical database, and/or network database.

In one embodiment, the control system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the control system 100 with the assistance of the processing element 205 and operating system.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 lx (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth™ protocols (e.g., Bluetooth™ Smart), wireless universal serial bus (USB) protocols, and/or any other wireless protocol.

The control system 100 may include or be in communication with one or more input elements, such as a keyboard input, a mouse input, a touch screen/display input, motion input, movement input, audio input, pointing device input, joystick input, keypad input, and/or the like. The control system 100 may also include or be in communication with one or more output elements (not shown), such as audio output, video output, screen/display output, motion output, movement output, and/or the like.

As will be appreciated, one or more of the control system's 100 components may be located remotely from other control system 100 components, such as in a distributed system. Furthermore, one or more of the components may be combined and additional components performing functions described herein may be included in the control system 100. Thus, the control system 100 can be adapted to accommodate a variety of needs and circumstances. As will be recognized, these architectures and descriptions are provided for exemplary purposes only and are not limiting to the various embodiments.

B. Exemplary User Device

Figure 3:
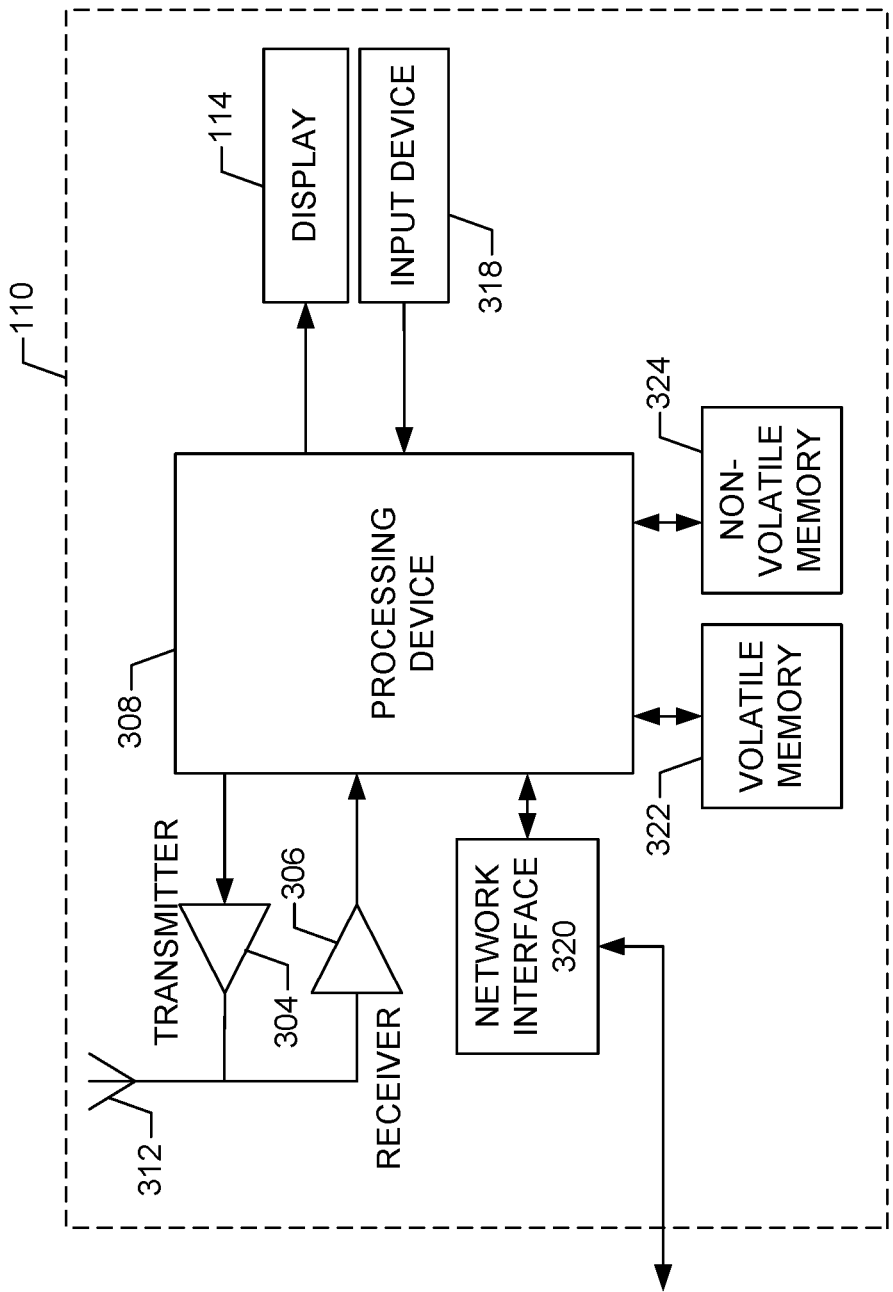
FIG. 3 schematically depicts a user device that communicates with the control system of FIG. 1 according to one or more embodiments shown and described herein.

FIG. 3 depicts a user device 110 that a user 5 (FIG. 8) may operate. As used herein, a user 5 (FIG. 8) may be an individual (e.g., sort personnel), group of individuals, and/or the like. In various embodiments, a user 5 may operate the user device 110, which may include one or more components that are functionally similar to those of the control system 100. In one embodiment, the user device 110 may be one or more mobile phones, tablets, watches, glasses (e.g., Google Glass, HoloLens, Vuzix M-100, SeeThru, Optinvent ORA-S, and the like), wristbands, wearable items/devices, head-mounted displays (HMDs) (e.g., Oculus Rift, Sony HMZ-T3W, and the like), the like, and/or any combination of devices or entities adapted to perform the functions, operations, and/or processes described herein. The term user device 110 is intended to refer to any device that projects, superimposes, overlays, or otherwise provides an image on a surface with respect to a user's viewing angle or line of vision or a user device 110's angle. The term user device 110 is intended to also include any other peripheral electronics and functionality that may be provided in conjunction with such devices. For example, a user device 110 may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), beacons for external sensors (e.g., infrared lamps), or the like. In one embodiment, the user device 110 can be used to provide an augmented reality environment/area, a mixed reality environment/area, and/or similar words used herein interchangeably to a user. The terms augmented/mixed environment/area should be understood to refer to a combined environment/area including the physical environment/area and elements of a virtual environment/area.

As shown in FIG. 3, the user device 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the control system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, BluetoothTM Smart, USB, and/or the like. Similarly, the user device 110 may operate in accordance with multiple wired communication standards and protocols, such as those described above with regard to the control system 100 via a network interface 320.

Via these communication standards and protocols, the user device 110 can communicate with various other entities (e.g., a location device 415) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include a location determining aspect, device, module, functionality, and/or similar words used herein interchangeably. For example, the user device 110 may include outdoor positioning aspects, such as a location module adapted to acquire, for example, latitude, longitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information may be determined by triangulating the user device 110's position in connection with a variety of other systems, including cellular towers, Wi-Fi access points, and/or the like. Similarly, the user device 110 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user device 110 may also detect markers and/or target objects. For example, the user device 110 may include readers, scanners, cameras, sensors, and/or the like for detecting when a marker and/or target object is within its point-of-view (POV)/field-of-view (FOV) of the real world environment/area. For example, readers, scanners, cameras, sensors, and/or the like may include RFID readers/interrogators to read RFID tags, scanners and cameras to capture visual codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located. For example, in some embodiments, the user device 110 may detect signals transmitted from an asset 10 (FIG. 5) and/or from a location device 415 (FIG. 1).

In one embodiment, the user device 110 may include accelerometer circuitry for detecting movement, pitch, bearing, orientation, and the like of the user device 110. This information/data may be used to determine which area of the augmented/mixed environment/area corresponds to the orientation/bearing of the user device 110 (e.g., x, y, and z axes), so that the corresponding environment/area of the augmented/mixed environment/area may be displayed via the display along with a displayed image. For example, the user device 110 may overlay an image in a portion of the user's POV/FOV of the real world environment/area.

The user device 110 may also comprise or be associated with an asset indicia reader, device, module, functionality, and/or similar words used herein interchangeably. For example, the user device 110 may include an RFID tag reader configured to receive information from passive RFID tags and/or from active RFID tags associated with an asset 10. The user device 110 may additionally or alternatively include an optical reader configured for receiving information printed on an asset 10. For example, the optical reader may be configured to receive information stored as a bar code, QR code, or other machine-readable code. The optical reader may be integral to the user device 110 and/or may be an external peripheral device in electronic communication with the user device 110. The optical reader may also or alternatively be configured to receive information stored as human readable text, such as characters, character strings, symbols, and/or the like. The user device 110 may utilize the asset indicia reader to receive information regarding an asset 10 to be sorted.

The user device 110 may also comprise a user interface (that can include a display or see-through display 114 coupled to a processing element 308 and/or a user input device 318 coupled to a processing element 308). For example, the user interface may be a user application, browser, user interface, and/or similar words used herein interchangeably executing on and/or accessible via the user device 110 to interact with and/or cause display of information, as described herein. The user interface can comprise any of a number of devices allowing the user device 110 to receive data, such as a keypad (hard or soft), a touch display, voice or motion interfaces, or other input device. In embodiments including a keypad, the keypad can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the control system 100 (FIG. 2), location device 415 (FIG. 1), and/or various other computing entities.

In another embodiment, the user device 110 may include one or more components or functionality that are the same or similar to those of the control system 100, as described in greater detail above. As will be recognized, these architectures and descriptions are provided for exemplary purposes only and are not limiting to the various embodiments.

Figure 4:
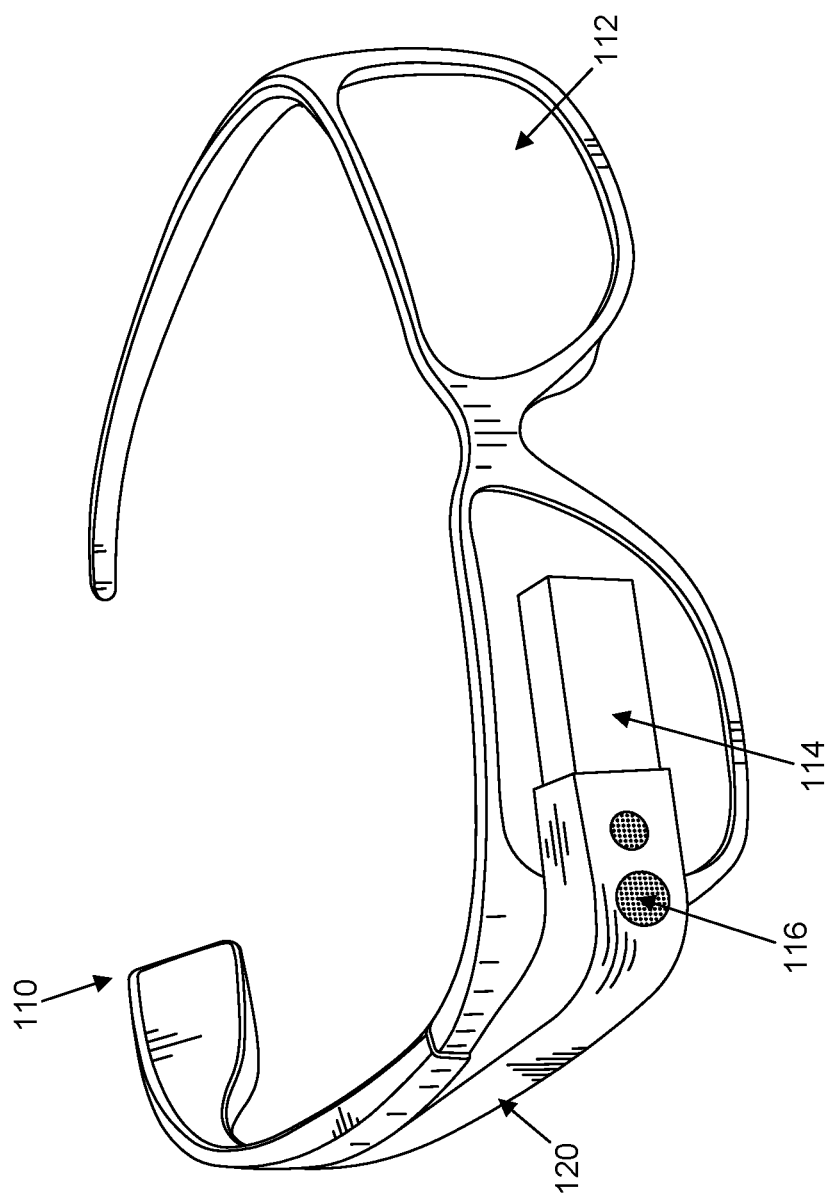
FIG. 4 schematically depicts the user device of FIG. 3 according to one or more embodiments shown and described herein.

FIG. 4 shows an embodiment of an exemplary user device 110 that sends, receives, and/or displays information related to the asset 10 (FIG. 5) and/or the sort location 400 (FIG. 1). In one embodiment, the user device 110 includes a set of glasses 112, as described in U.S. Pat. No. 7,063,256, which is hereby incorporated by reference in its entirety. The glasses 112 include the display 114, and an information gathering device such as an image camera 116. The user device 110 may further include a local computer 120 having the processing device 308 (FIG. 3), the antenna 312 (FIG. 3), the network interface 320 (FIG. 3), the transmitter 304 (FIG. 3), the receiver 306 (FIG. 3), the volatile memory 322 (FIG. 3), and/or the non-volatile memory 324 (FIG. 3). In some embodiments, the user device 110 is an optical, wearable display, such as Google Glass, available from Google Inc., or HoloLens available from Microsoft Inc.

In other embodiments, the display may be a device separate from the glasses through which the items may be viewed or, in other embodiments, on which a representation of the item may be viewed wherein such representation may include outline images of the items, symbols that represents the items or characteristic information about the items.

Figure 8:
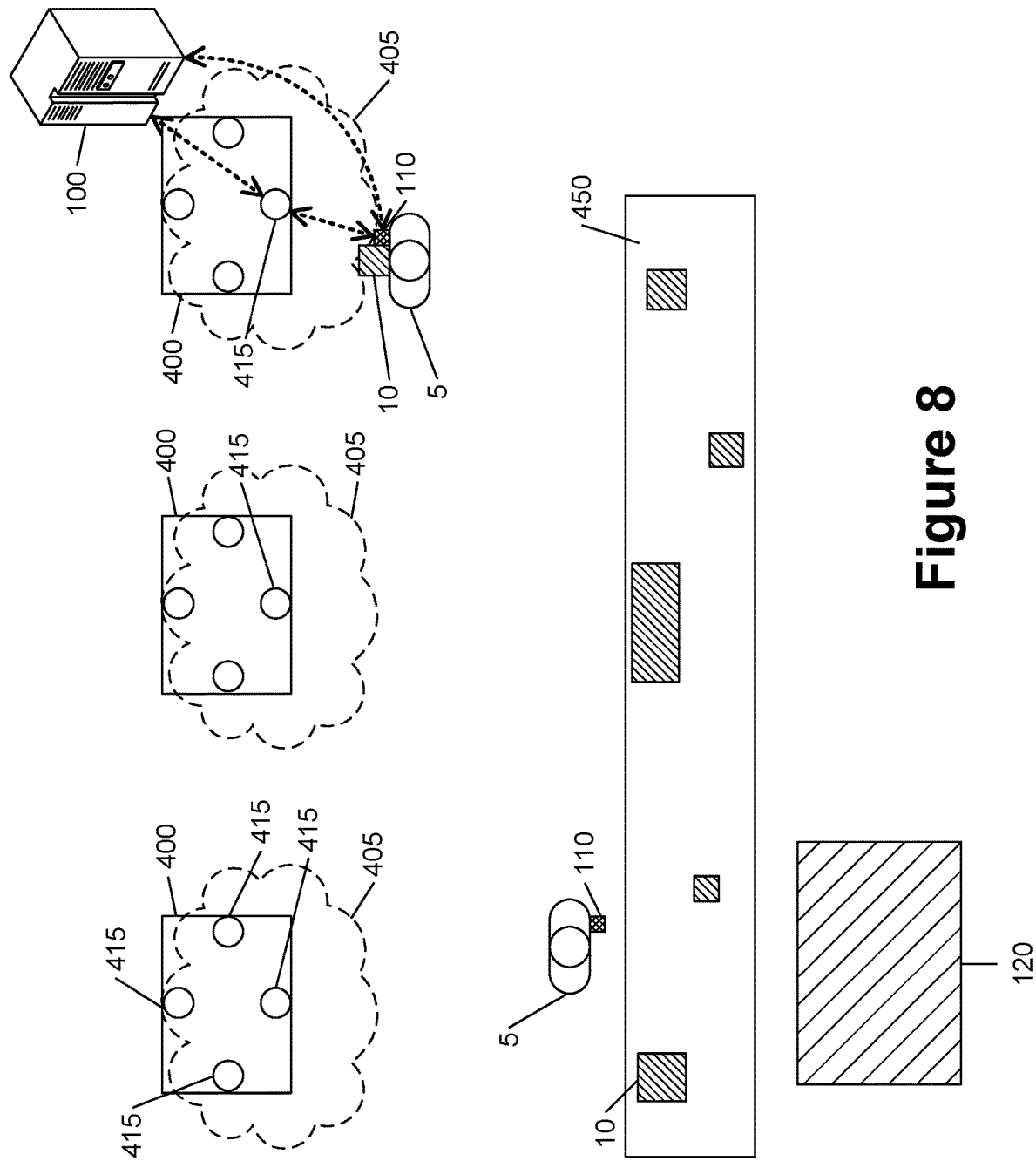
FIG. 8 schematically depicts a facility which assets are sorted according to one or more embodiments shown and described herein.

In the embodiment shown in FIG. 4, the information gathering device is an image camera 116 that is mounted on the glasses 112. The image camera 116, in one embodiment, is a center-view visible light camera that is used to acquire label images and may acquire images associated with an asset 5 (FIG. 5). The POV/FOV of the image camera 116 may correspond to the direction of the user device 110 and therefore the POV/FOV of the user 5 (FIG. 8). With the POV/FOV, images can be presented to the user of target objects (e.g., an asset 10) that are within the environment/area of the user device 110. For example, while the user 5 (FIG. 8) is going about his daily work, the user device 110 can display the corresponding environment/area and images overlaid on the same. The displayed image may include images (e.g., stock images of assets 10 or actual images of assets 10), text (sorting instructions or warnings), video (e.g., handling procedures), menus, selection boxes, navigation icons, and/or the like.

The local computer 120 is comprised of a computer including the network interface 320 (FIG. 3) which may determine the orientation and position determination of the user 5 (FIG. 8) based on images obtained from the image camera 116. Alternatively, the local computer 120 may determine the orientation and position of the user 5 (FIG. 8) based on a location module adapted to acquire, for example, latitude, longitude, geocode, course, direction, heading, speed, universal time (UTC), date, and/or various other information/data, as described above. The local computer 120 also performs view-plane computations, which is a process that uses the three-dimensional position data for each relevant object, and determines the position and orientation of the wearer of the user device 110. The local computer 120 manages the application-provided display symbology for each relevant object to determine what is to be displayed in the display 114 and where to display the information such that it appears superimposed proximately about or on an item, such as an asset 10 (FIG. 5). The local computer 120 packaging may also contain a power source (not shown), which may be self-contained such as, for example, batteries or other forms of rechargeable, replaceable, reusable or renewable power sources.

C. Exemplary Acquisition/Display Entity

FIG. 5 depicts an acquisition/display entity 115 in communication with the control system 100, where the acquisition/display entity 115 shows information associated with an asset 10 according to one embodiment. In the embodiment depicted in FIG. 5, the acquisition/display entity 115 may comprise one or more acquisition devices 410 for acquiring information/data from an asset 10 and a display 420 for showing information/data associated with the asset 10, as described in U.S. patent application Ser. No. 14/204,657, which is hereby incorporated by reference in its entirety. In one embodiment, each asset 10 may include an item/shipment identifier, such as an alphanumeric identifier. Such item/shipment identifiers may be represented as text, barcodes, Aztec Codes, MaxiCodes, Data Matrices, Quick Response (QR) Codes, electronic representations, tags, character strings, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein. As shown, the one or more acquisition devices 410 may be capable of acquiring data (including item/shipment identifiers) for one or more acquisition zones 401 positioned in front of one or more work zones 405. The acquisition devices 410 may communicate this data to the control system 100 (FIG. 2). Thus, an item traveling on a conveying mechanism 402 (e.g., conveyor belt, slide, chute, bottle conveyor, open or enclosed track conveyor, I-beam conveyor, cleated conveyor, and/or the like) can pass through an acquisition zone 401 prior to entering an intake location 450. However, as will be understood by one skilled in the art, the acquisition zone 401 may at least partially overlap the intake location 450 such that an asset 10 may reside in both the acquisition zone 401 and intake location 450 simultaneously. In various embodiments, the acquisition zone 401 and intake location 450 may be substantially the same size and shape. However, as will be understood by one skilled in the art, the acquisition zone 401 and intake location 450 may be of different sizes and/or shapes. In various embodiments, the acquisition device 410 can be positioned substantially above the conveying mechanism 402. However, the acquisition device 410 may be located at any other position in relation to the conveying mechanism 402, such as substantially above and adjacent to an edge of the conveying mechanism 402.

In certain embodiments, the acquisition device 410 may include or be associated with one or more imaging devices configured to capture images (e.g., image data) of assets 10 (and/or item/shipment identifiers) moving along the conveying mechanism 402. For example, the acquisition device 410 may include or be associated with a video camera, camcorder, still camera, web camera, Single-Lens Reflex (SLR) camera, high-speed camera, and/or the like. In various embodiments, the acquisition device 410 may be configured to record high-resolution image data (e.g., images comprising at least 480 horizontal scan lines) and/or to capture image data at a high speed (e.g., utilizing a frame rate of at least 60 frames per second). Alternatively, the acquisition device 410 may be configured to record low-resolution image data (e.g., images comprising less than 480 horizontal scan lines) and/or to capture image data at a low speed (e.g., utilizing a frame rate less than 60 frames per second). As will be understood by those skilled in the art, the acquisition device 410 may be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second). In various embodiments, the acquisition device 410 may be configured to capture image data of the assets 10 and conveying mechanism 402 of sufficient quality that a user viewing the image data on the display 420 can identify each asset 10 represented in the displayed image data. For example, in embodiments wherein the conveying mechanism 402 and assets 10 are moving at a high rate of speed, the acquisition device 410 may be configured to capture image data at a high speed. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest, codes, item/shipment identifiers, and/or the like) can be extracted from the image data.

The acquisition device 410 may additionally include or be associated with one or more scanners, readers, interrogators, and similar words used herein interchangeably configured for capturing item indicia for each asset 10 (e.g., including item/shipment identifiers). For example, the scanners may include a barcode scanner, an RFID reader, and/or the like configured to recognize and identify item/shipment identifiers associated with each asset 10. In one embodiment, the acquisition device 410 may be capable of receiving visible light, infrared light, radio transmissions, and other transmissions capable of transmitting information to the acquisition device 410. Similarly, the acquisition device 410 may include or be used in association with various lighting, such as light emitting diodes (LEDs), Infrared lights, array lights, strobe lights, and/or other lighting mechanisms to sufficiently illuminate the zones of interest to capture image data for analysis.

In various embodiments, information associated with items can be presented via a display 420. The display 420 may take a variety of forms, such as a Liquid Crystal Display (LCD), a Liquid Crystal on Silicon (LCoS) display, an Active Matrix Organic Light-Emitting Diode (AMOLED) display, a Digital Light Processing (DLP) display, a plasma display, a Cathode Ray Tube (CRT) display, a projected laser, an electronic ink display, and/or the like. The display 420 may be in direct communication with the acquisition device 410 or may indirectly in communication with the acquisition device through the control system 100 (FIG. 2). The display 420 may be configured for direct viewing, rear projection onto a surface, or front projection onto a surface. For example, in some embodiments, the display 420 may project images directly on or proximate to the assets 10, as described in U.S. Pat. No. 7,090,134, which is incorporated herein in its entirety.

The display 420 may be fixed in a particular location, it may be movable to various locations, or it may be wearable by a user. In various embodiments, the display 420 may display images using a black-and-white display, a grey-scale display, and/or a color display. The displayed information may be correlated to the specific assets 10, or may be general information unrelated to the specific assets 10. The displayed information, for instance, may be in the form of sorting instructions informing a user located near the intake location 450 how each asset 10 should be processed or handled, the source of an asset 10, and/or the like. Alternatively, the displayed information may comprise information regarding the volume of assets 10 on the conveying mechanism, or information regarding upcoming scheduled user breaks (e.g., a lunch break). As will be recognized, a variety of other approaches and techniques can be used to adapt to various needs and circumstances. Similar to the controller system 100 described above, in one embodiment, the acquisition/display entity 115 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the acquisition/display entity 115 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, NFC protocols, Bluetooth™ protocols, wireless USB protocols, and/or any other wireless protocol.

As will be understood by those skilled in the art, the system may include more than one acquisition device 410 and/or display 420. In various embodiments, one or more additional acquisition devices may be used to capture additional image data at one or more additional acquisition zones located on the conveying mechanism 402 or an additional conveying mechanism. Such additional acquisition devices may be located, for example, after the flow of items along the conveying mechanism 402 is disturbed (e.g., the flow of assets 10 is culled, merged with an additional flow of assets 10, or diverted to an additional conveying mechanism). Alternatively, one or more additional acquisition devices may be located along the conveying mechanism 402 after the intake location 450, such that the one or more additional acquisition devices may capture updated image data after one or more of the assets 10 may have been removed from the conveying mechanism 402. In various embodiments, the one or more additional acquisition devices may include components substantially similar to the acquisition device 410. For example, the one or more additional acquisition devices may include or be associated with one or more imaging devices and one or more scanners, readers, interrogators, and similar words used herein interchangeably, as described above in regards to the acquisition device 410. However, the one or more additional acquisition devices may include fewer components than acquisition device 410. For example, the one or more additional acquisition devices may not include a scanner, reader, interrogator, or similar words used herein, and may be configured to receive item identifiers from the acquisition device 410.

In various embodiments, one or more additional displays may be located such that they are visible from one or more additional work zones (e.g., an additional work zone located on the conveying mechanism after the intake location 450). The one or more additional displays may be substantially similar to the display 420. For example, the one or more additional displays may be configured to display image data to an additional user sorting items at an additional sorting location. The one or more additional displays may be configured to display the image data captured by the acquisition device 410, or may be configured to present the updated image data captured by one or more additional acquisition devices.

FIGS. 6a and 6b and FIGS. 7a and 7b show exemplary schematics showing the intake location 450 and a display 420 at particular points in time. As shown in FIG. 6a, the intake location 450 contains four assets 10 moving along the conveying mechanism 402 with a certain orientation. At the same time, the display 420 may be configured to present captured image data (e.g., video) containing representations of the same four assets 10 with corresponding display features 451 as shown in FIG. 6b. In the embodiment depicted in FIG. 6b, the display features 451 may be utilized to convey additional information to a user 5 (FIG. 8) related to the asset 10. For example, as shown in FIG. 6b, the display features 451 indicate different designations for each of the assets 10, depicted as "3A," "4A," and "4B," which may indicate different sort locations 400 (FIG. 8) to which each of the assets 10 are to be placed.

FIG. 7a shows a second exemplary schematic of an intake location 450; however as shown in FIG. 7a, only one asset 10 is completely within the intake location 450 and two assets 10 are partially within the intake location 450. The corresponding display 420, shown in FIG. 7b, presents captured image data of the one full item and two partial items corresponding to each of the items 450 at least partially within the intake location 450 and corresponding display features 451 located on or near each asset 450a. Alternatively, the display 420 may incorporate a predetermined delay (e.g., 20 seconds), prior to presenting the image data (e.g., video) via the display 420.

D. Exemplary Location Device

In various embodiments, one or more sort locations 400 may be associated with one or more location devices 415 configured for identifying one or more assets 10 being sorted to each sort location 400. As non-limiting examples, such sort locations 400 may include one or more vehicles (e.g., aircraft, tractor-trailer, cargo container, local delivery vehicles, and/or the like), pallets, identified areas within a building, bins, chutes, conveyor belts, shelves, and/or the like. The one or more location devices 415 may be attached to a sort location 400 or located within a sort location 400. Alternatively the one or more location devices 415 may be located adjacent to a sort location 400 or otherwise proximate the sort location 400. In various embodiments, a location device 415 may be located proximate to an area designated to store the sort location 400. For example, when the sort location 400 includes a delivery vehicle, a location device 415 may be located above each of a plurality of parking areas designated for one or more delivery vehicles.

In various embodiments, the one or more location devices 415 may include components functionally similar to the control system 100 and/or the user device 110. As noted above in referencing the control system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein Like the user device shown schematically in FIG. 3, the location device 415 can include an antenna, a transmitter (e.g., radio), a receiver (e.g., radio), and a processing element (e.g., CPLDs, microprocessors, multi-core processors, coprocessing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the location device 415 may be capable of operating with one or more air interface standards, communication protocols, modulation types, and access types. More particularly, the location device 415 may operate in accordance with any of a number of wireless communication standards and protocols, such as those described above with regard to the control system 100. In a particular embodiment, the location device 415 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™, USB, and/or the like. Similarly, the location device 415 may operate in accordance with multiple wired communication standards and protocols, such as those described above with regard to the control system 100 via a network interface.

Via these communication standards and protocols, the location device 415 can communicate with various other entities (e.g., the user device 110) using concepts such as USSD, SMS, MMS, DTMF, and/or SIM dialer. The location device 415 can also download changes, add-ons, and updates, for instance, to its firmware, software (e.g., including executable instructions, applications, program modules), and operating system.

According to one embodiment, the location device 415 may include a location determining aspect, device, module, functionality, and/or similar words used herein interchangeably. For example, the location device 415 may include outdoor positioning aspects, such as a location module adapted to acquire, for example, latitude, longitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the location device 415's position in connection with a variety of other systems, including cellular towers, Wi-Fi access points, and/or the like. Similarly, the location device 415 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, BLE transmitters, NFC transmitters, and/or the like. These indoor positioning aspects can be used in a variety of settings to determine the location of someone or something to within inches or centimeters.

The location device 415 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the location device 415. As indicated, this may include a user application that is resident on the entity or accessible through a browser or other user interface for communicating with the control system 100, user device 110, and/or various other computing entities.

In another embodiment, the location device 415 may include one or more components or functionality that are the same or similar to those of the control system 100 or user device 110, as described in greater detail above. As will be recognized, these architectures and descriptions are provided for exemplary purposes only and are not limiting to the various embodiments.

E. Exemplary Sort Location

Figure 9:
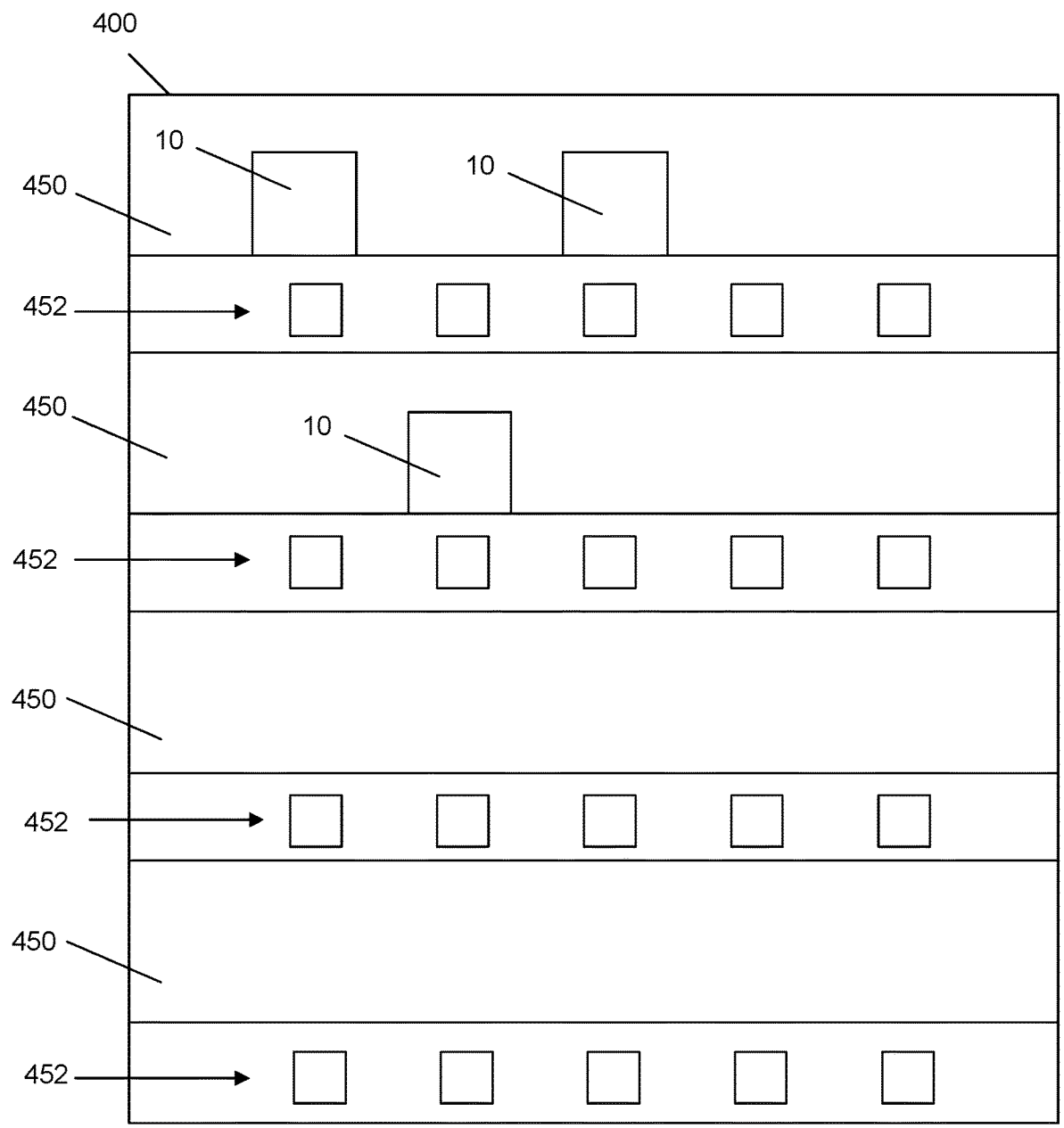
FIG. 9 schematically depicts a sort location of the facility of FIG. 8 according to one or more embodiments shown and described herein.

Referring to FIG. 9, an exemplary sort location 400 is schematically depicted. As described above, the sort location 400 may include may include one or more vehicles (e.g., aircraft, tractor-trailer, cargo container, local delivery vehicles, and/or the like), pallets, identified areas within a building, bins, chutes, conveyor belts, shelves, and/or the like. In the embodiment depicted in FIG. 9, the sort location 400 includes a plurality of shelves 450 onto which the assets 10 may be placed. While FIG. 9 depicts the plurality of shelves 450 as being stacked in a vertical direction, it should be understood that the shelves 450 may be arranged in any suitable configuration to hold the assets 10. Each of the shelves 450 include one or more visual indicators 452 positioned on or proximate to the shelves 450. The visual indicators 452 may assist in identifying an appropriate position for placement of the asset 10 within the sort location, as described in U.S. Pat. No. 9,156,628, which is incorporated herein in its entirety. In particular, a user 5 (FIG. 8) may utilize the indicia reader of the user device 110 to scan, read, or otherwise receive asset identifier data from the asset 10 to identify, in cooperation with the control system 100, an appropriate position for placement of the asset 10 within the sort location 400.

The control system 100 may determine the appropriate position for placement of the asset 10 within the sort location 400 based on a variety of factors. For example and without limitation, the control system 100 may determine the appropriate position for placement of the asset 10 within the sort location 400 based on the destination of the assets 10. When the sort location 400 includes a vehicle, such as a delivery truck, the assets 10 may be placed within the sort location 400 based on the order in which the assets 10 will be unloaded and delivered. In some embodiments, the control system 100 may identify an asset 10 designated for special or expedited handling (sometimes referred to as a "hot pull") based on the asset identifier data, and the control system 100 may determine placement of the asset 10 to facilitate easy access to the asset 10 in the sort location 400 to allow expedited handling. In some embodiments, the control system 100 may utilize an algorithm based on the attributes of the asset (such as the size and/or shape of the asset 10) to determine the placement of the asset 10 within the sort location 400 to optimize space and stability of the assets 10 within the sort location. One example of an algorithm to determine the placement of assets within the sort location 400 is described in U.S. Pat. No. 5,908,283, which is incorporated by reference herein in its entirety.

When the control system 100 identifies the appropriate position for the asset 10 within the sort location 400, the control system 100 may command one or more of the visual indicators 452 to provide a visual indication (e.g., by illuminating the visual indicator 452) of the appropriate location for the asset 10. Once the asset 10 is positioned in the appropriate location on the shelf 450, the user 5 (FIG. 8) may utilize the user device 110 to send a signal to the control system 100 that the asset 10 has been placed in the appropriate location. Alternatively, the sort location 400 may include a user interface, such as a keyboard, a touchscreen, or the like, that the user 5 may communicate with the control system 100 that the asset 10 has been placed in the appropriate location. In some embodiments, the sort location 400 may include one or more sensors, such as a light sensor, proximity sensor, or the like, configured to detect the presence of an asset 10 within the sort location 400, and the sensors may send a signal to the control system 100 when the asset 10 has been placed into the appropriate location.

IV. EXEMPLARY CONTROL SYSTEM CONFIGURATION

In various embodiments, the control system 100 may comprise a plurality of modules, each module configured to perform at least a portion of the functions associated with the methods described herein. For example, the control system 100 may comprise an acquisition module, a sort location module, a matching module, and a notification module. Although described herein as being individual components of the control system 100, the various modules may operate on a combination of one or more devices (e.g., the user device 110, the location device 415, and/or the control system 100), such that each device performs the functions of one or more modules.

A. Acquisition Module

In various embodiments, the acquisition module may be configured to obtain asset identifier data regarding an asset 10 to be sorted. In various embodiments, the asset identifier data may comprise a unique asset identifier such as a tracking number or code, and data defining the one or more appropriate sort locations 400 for the asset 10 as it moves between an origin and a destination, and/or the like.

As a non-limiting example, the acquisition module may be configured to obtain data from the user device 110 (FIGS. 3 and 4) and/or the acquisition device 410 (FIG. 5). In various embodiments, the data received from the user device 110 (FIGS. 3 and 4) and/or the acquisition device 410 (FIG. 5) may include the entirety of the asset identifier data and therefore the acquisition module need only receive asset identifier data from the user device 110 (FIGS. 3 and 4) and/or the acquisition device 410 (FIG. 5). However, in various embodiments, the data received from the user device 110 (FIGS. 3 and 4) and/or the acquisition device 410 (FIG. 5) may comprise only a portion of the asset identifier data, and the acquisition module may be configured to obtain the remainder of the asset identifier data from one or more other sources. As a non-limiting example, the acquisition module may be configured to search one or more databases in communication with the control system 100 for asset identifier data corresponding to the data received from the user device 110 (FIGS. 3 and 4) and/or the acquisition device 410 (FIG. 5). The acquisition module may additionally be configured to receive and store at least a portion of the asset identifier data corresponding to the asset 10 that is stored in one or more databases.

In various embodiments, the acquisition module may be configured to transmit at least a portion of the asset identifier data to one or more devices (e.g., the user device 110, the location device 415, the display 420, and/or the control system 100) and/or one or more modules (e.g., the sort location module, the matching module, and/or the notification module). Moreover, upon receiving the asset identifier data regarding an asset 10 to be sorted, the acquisition module may be configured to link or otherwise associate the user device 110 and the asset identifier data. As will be described in greater detail herein, the user device 110 may be associated with the asset identifier data by storing at least a portion of the asset identifier data in a memory associated with the user device 110.

B. Sort Location Module

The sort location module may be configured to receive asset identifier data from the acquisition module. The sort location module is configured to ascertain the appropriate sort location 400 and/or the appropriate position within the sort location 400 for the asset 10 based at least in part on the asset identifier data. In certain embodiments, the sort location module may be configured to determine the appropriate sort location 400 based at least in part on the asset identifier data and sort location data that is associated with the each of the plurality of sort locations 400.

In various embodiments, each of the plurality of sort locations 400 may be identified by sort location data, which may include a unique sort location identifier. The unique sort location identifier may comprise a unique character string individually identifying each of the plurality of sort locations 400. In various embodiments, the sort location data may define any subsequent processing to be performed on assets 10 within each sort location 400, and may comprise the unique sort location identifier for each of the plurality of sort locations 400 the assets 10 will pass through. In various embodiments, the sort location module may determine whether the processing to be performed on assets 10 in each of the plurality of sort locations 400 (as defined in the sort location data) will move the asset 10 closer to its final destination. In various embodiments, the sort location module may determine whether the processing steps to be performed on the assets 10 in each of the sort locations 400 complies with the service level (e.g., Same Day shipping, Next Day Air, Second Day Air, 3 Day Select, Ground shipping, and/or the like) corresponding to the asset 10. As a non-limiting example, the sort location module may determine the appropriate sort location for an asset 10 to be delivered to 123 Main Street, Atlanta, Georgia is a delivery vehicle that will deliver other assets 10 to the same address or nearby addresses (e.g., along the same delivery route). As a second non-limiting example, the sort location module may determine the appropriate sort location for an asset 10 to be delivered to 345 Broad Street, Los Angeles, Calif. via Next Day Delivery is a pallet to be loaded onto a plane destined for Los Angeles, Calif.

After determining the appropriate sort location 400 and/or the appropriate position for the asset 10 within the sort location 400, the sort location module may be configured to transmit data defining the appropriate sort location 400 and/or the appropriate position for the asset 10 within the sort location 400 to one or more devices (e.g., the user device 110, the display 420, the visual indicator 452, the location device 415, and/or the control system 100) and/or modules (e.g., the matching module and/or the notification module).

C. Matching Module

The matching module may be configured to receive asset identifier data from the acquisition module and/or the sort location module, and may be configured to receive data defining the appropriate sort location from the sort location module. Moreover, the matching module may be configured to receive data indicating the user device 110 (and consequently the asset 10) is proximate a first sort location 400. In various embodiments and referring to FIG. 5, the user device 110 and/or one or more location devices 415 may determine that the user device 110 is within a communication area 405 corresponding to the one or more location devices 415, and is therefore proximate to the first sort location 400 corresponding to the one or more location devices 415. As a non-limiting example, each of the one or more location devices 415 may be embodied as a wireless beacon broadcasting a signal indicating the identity of the associated sort location. In various embodiments, each sort location may be associated with a plurality of such location devices 415. The user device 110 may be configured to receive the wireless signals broadcast from the plurality of location devices 415 and determine whether the received signal satisfies one or more signal criteria. For example, the user device 110 may determine whether the signal received from each of the plurality of location devices 415 satisfies a predetermined signal strength threshold and/or may determine whether wireless signals are received from at least a minimum number of location devices 415 broadcasting data regarding a single sort location. Upon a determination that the signal received from the plurality of location devices 415 satisfies each of the signal criteria, the user device 110 may transmit asset identity data and sort location identity data to the matching module to determine whether the user device 110 is proximate the appropriate sort location for the asset.

Upon determining the user device 110 is proximate a first sort location 400, at least one of the user device 110 and the one or more location devices 415 may transmit data indicating the user device 110 is proximate the first sort location 400 to the matching module. The data indicating that the user device 110 is proximate the first sort location 400 may also be indicative of the identity of the first sort location 400 (e.g., the data may comprise the unique sort location identifier corresponding to the first sort location 400). The matching module may be configured to determine whether the first sort location 400 is the appropriate sort location based at least in part on the received data defining the appropriate sort location.

In various embodiments, the matching module may be configured to transmit data indicating whether the first sort location 400 is the appropriate sort location to one or more devices (the user device 110 and/or the one or more location devices 415) and/or one or more modules (e.g., the notification module). For example, upon a determination that the proximate sort location 400 is the appropriate sort location, the matching module may generate and transmit confirmation data to the notification module for additional processing. Alternatively, upon a determination that the proximate sort location 400 is not the appropriate sort location, the matching module may generate and transmit mistake data to the notification module for additional processing.

In various embodiments, the matching module may additionally be configured to link and/or associate the asset identifier data and the sort location identifier data corresponding to the sort location 400 at which the asset is deposited. As a non-limiting example, the asset identifier data may be updated to reflect the link between the asset identifier data and the sort location identifier data. Alternatively, the sort location identifier data may be updated to reflect each of the assets associated with the sort location 400. As described herein, the matching module may be configured to link the asset identifier data and the sort location identifier data upon the occurrence of a triggering event, as will be described in greater detail herein.

To link and/or associate the asset identifier data and the sort location identifier data corresponding to the sort location 400 at which the asset it deposited, the matching module may receive at least a portion of the asset identifier data and at least a portion of the location data and associate these data in, for example, one or more databases. As previously noted, however, the matching module may be configured to associate the asset identifier data and the sort location data by updating at least one of the asset identifier data or the sort location data to reflect the association. Again, the updated data may be stored in one or more databases.

D. Notification Module

In various embodiments, the notification module may receive data indicating whether the first sort location 400 is the appropriate sort location from the matching module. As described herein, the notification module may cause one or more alerts to be generated in order to notify the user 5 (e.g., sort personnel) whether the asset 10 should be deposited in the first sort location 400. For example, the notification module may be configured to transmit confirmation data and/or mistake data to the user device 110, the display 420, and/or the one or more location devices 415 in order to cause at least one of the devices to generate an alert discernible by the user 5 (e.g., sort personnel) indicative of the appropriate sort location for the asset 10.

In various embodiments, the notification module may cause the user device 110 to display a confirmation message upon a determination that the first sort location 400 is the appropriate sort location. As non-limiting examples, the confirmation message may indicate that the first sort location 400 is the appropriate sort location, or the confirmation message may indicate that an asset has been deposited at the appropriate sort location 400. Alternatively, the notification module may cause a light located near the first sort location 400 to illuminate upon a determination that the first sort location 400 is the appropriate sort location 400. As yet another non-limiting example, the notification module may cause the user device 110 to display a message upon a determination that the first sort location 400 is not the appropriate sort location 400. Similarly, the notification module may cause a light located near the first sort location 400 to illuminate upon a determination that the proximate sort location 400 is not the appropriate sort location. In various embodiments, the notification module may cause one or more sounds to be generated, one or more lights to illuminate, one or more mechanical assemblies to move, and/or other processes discernible by a user 5 to operate and thus indicate to the user 5 whether the first sort location 400 is the appropriate sort location.

Moreover, the notification module may be configured to generate an alert after associating asset identifier data with location data. The notification module may be configured to generate an alert to inform the user 5 (e.g., sort personnel) or other users regarding asset identifier data being associated with location data. As a non-limiting example, the notification module may be configured to cause a message to be displayed via the user device 110 and/or the display 420 in order to notify the user 5 that asset identifier data corresponding to an asset 10 has been associated with location data corresponding to a sort location. Thus, the notification module may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

V. EXEMPLARY SYSTEM OPERATION

As will be described in greater detail herein, the various entities illustrated in FIG. 1 may operate to provide a user 5 (e.g., sort personnel) information regarding the appropriate sort location to deposit an asset 10.

A. Exemplary User Device Operation

FIG. 8 illustrates an exemplary environment in which assets 10 are moved from an intake location 450 (e.g., an unsorted location) to one or more sort locations 400. In various embodiments, a user 5 (e.g., sort personnel) may utilize a user device 110 as described herein while transporting assets 10 from an intake location 450 to one or more sort locations 400. As described herein, the user device 110 may be configured for receiving information regarding a particular asset 10 to be sorted, and for informing the user 5 whether the asset 10 is being sorted to the appropriate sort location.

Figure 10:
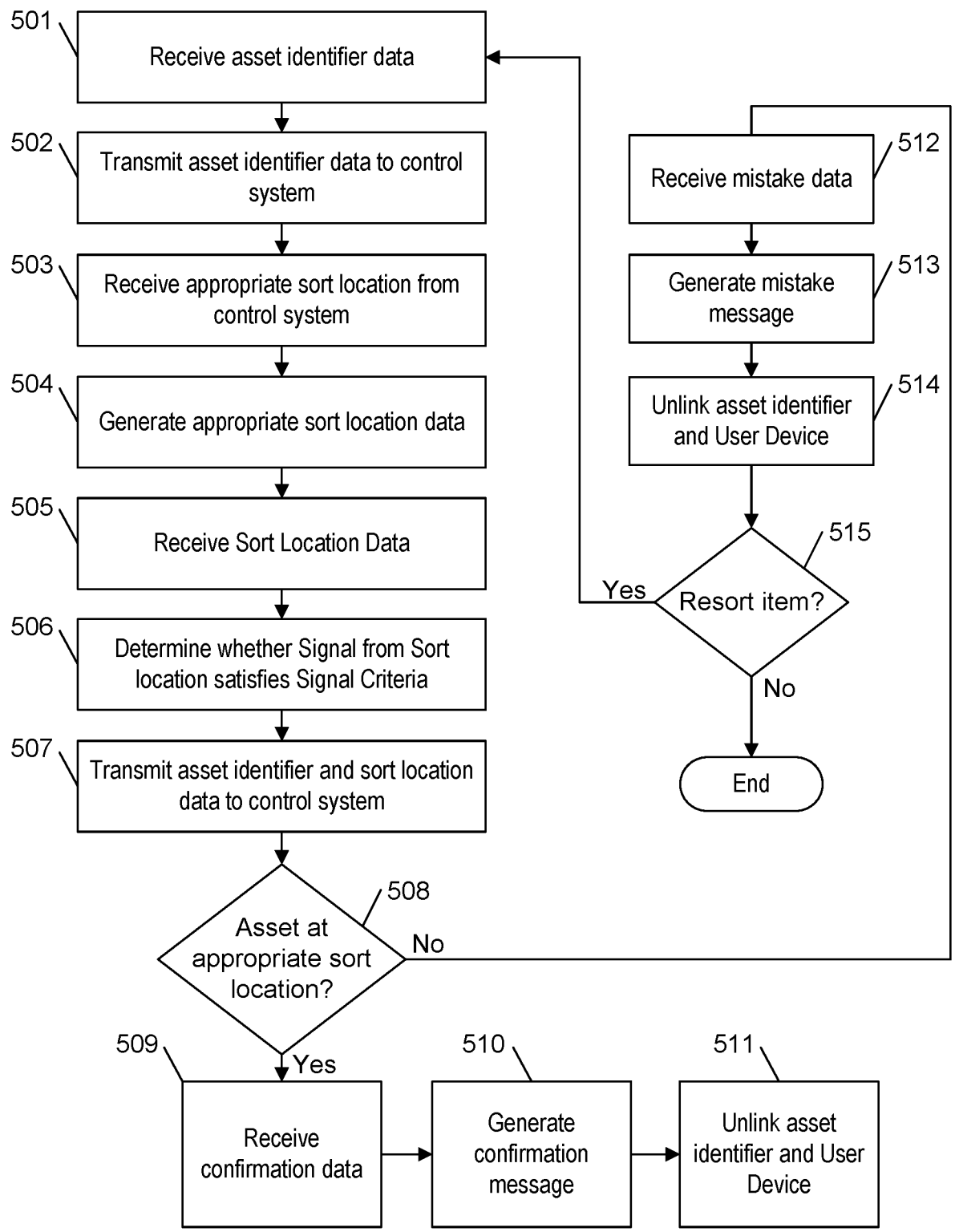
FIG. 10 schematically depicts a flowchart illustrating operations and processes performed by the user device of FIG. 3 according to one or more embodiments shown and described herein.

FIG. 10 illustrates exemplary steps carried out by the user device 110 according to various embodiments of the present invention. As illustrated in FIG. 10, the user device 110 and/or the acquisition device 410 may be configured to receive asset identifier data associated with an asset 10 to be sorted at Block 501. In various embodiments, the user 5 may utilize the indicia reader of the user device 110 to scan, read, or otherwise receive asset identifier data from the asset 10. Alternatively or additionally, the acquisition device 410 may scan, read, or otherwise receive asset identifier data from the asset 10. As noted herein, the asset identifier data may be printed or otherwise affixed to the asset 10 to be sorted. In various embodiments, the user device 110 and/or the acquisition device 410 may receive asset identifier data by, for example, reading an RFID tag associated with the asset 10, reading a bar code, QR code, character string, and/or symbol printed on the asset 10 or otherwise associated with the asset 10, and/or otherwise obtaining asset identifier data regarding the asset 10 to be sorted. The user device 110 may be configured to store the asset identifier data in a memory associated with the user device for later retrieval and use.

As noted above, in various embodiments, the asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. As described above, the asset identifier data may additionally include indications designating an asset 10 for special or expedited handling. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location 400 for the asset 10 to be sorted (a process described in greater detail herein), the asset identifier data may be updated to reflect the appropriate sort location 400. The asset identifier data 400 may additionally be updated to reflect the appropriate position of the asset 10 within the sort location 400. Alternatively, the asset identifier data may be fixed after being created, such that it is not updated with new and/or alternative information during shipment.

After receiving asset identifier data regarding the asset 10 to be sorted, the user device 110 and/or the acquisition device 410 may be configured to transmit the asset identifier data to the control system 100 at Block 502. The control system 100 may be configured to determine an appropriate sort location for the asset 10 based at least in part on the asset identifier data. The control system 100 may be configured to transmit data identifying the appropriate sort location to the user device 110 and/or the acquisition device 410, and the user device may be configured to receive data indicative of the appropriate sort location from the control system 100 at Block 503. In various embodiments, the asset identifier data may be updated to reflect the appropriate sort location 400. The control system 100 may be configured to update the asset identifier data stored within an asset identifier database. Alternatively, after receiving the appropriate sort location 400 from the control system 100, the user device 110 may be configured to update the asset identifier data stored within a memory associated with the user device 110. Similarly, after receiving the appropriate sort location 400 from the control system 100, the acquisition device 410 may be configured to update the asset identifier data stored within a memory associated with the acquisition device 410.

In various embodiments, the user device 110 may be configured to inform the user 5 (e.g., sort personnel) of the appropriate sort location 400 for the asset 10 at Block 504. Alternatively or additionally, the display 420 may be configured to inform the user 5 of the appropriate sort location 400 for the asset 10 at Block 504. As a non-limiting example, the user device 110 may cause display of the appropriate sort location via the display 114 to the user 5 (e.g., sort personnel) or may audibly inform the user 5 of the appropriate sort location for the asset 10. In one embodiment, the display 114 of the user device 110 (e.g., glasses) may display an indication of the appropriate sort location 400 shown superimposed over or positioned proximate to the asset 10. For example, upon receiving the appropriate sort location 400 from the control system 100, the user device 110 may display an indication of the sort location 400 on the display 114. In such embodiments, the user device 110 may display the indication of the sort location 400 on the display 114 regardless of the FOV of the user device 110. Alternatively, in some embodiments, the presentation of the indication of the sort location 400 on the display 114 may be dependent upon a detected FOV of the user device 110. For example, as described above, the user device 110 may detect an asset 10 within its FOV. Upon detecting an asset 10 within the FOV of the user device 110, the local computer 120 of the user device 110 may generate an augmented reality (AR) image or layer for presentation on the display 114. The AR image or layer may be based on the detection of the asset 10 by the user device 110 and the received appropriate sort location 400 from the control system 100. The user device 110 may then display the AR image or layer on the display 114 such that the sort location 400 is overlaid over or positioned proximate to the asset 10 when the asset 10 is within the FOV of the user device 110.

In embodiments including the display 420 (FIG. 5), the indication of the appropriate sort location may be shown on the display 420 and/or projected onto the asset 10. The displayed sort location 400 may comprise a sort location identifier, such as a symbol, character string, and/or the like. Additionally, in various embodiments, information indicative of the appropriate sort location may be printed on the asset 10 (e.g., directly onto a surface of the asset 10, onto a sticker or other label secured to the asset 10, and/or the like). In various embodiments, the user device 110 and/or the display 420 may not display the appropriate sort location for the asset 10, and accordingly the user 5 may rely on the information printed on the asset 10 to determine the appropriate sort location. Accordingly, in such embodiments, after receiving asset identifier data as illustrated in Block 501 of FIG. 10, the user device may be configured to thereafter await receipt of sort location data as illustrated in Block 505.

The user 5 (e.g., sort personnel) may transport the asset 10 and the user device 110 to a sort location 400. As the user 5 nears the sort location 400 (e.g., enters the communication area 405 corresponding to the sort location 400), the user device 110 may establish a wireless communication connection with one or more location devices 415 associated with the sort location 400 and receive sort location data from the one or more location devices 415 at Block 505. For example, the user device 110 and location devices 415 may be configured to establish a communication connection when the user device 110 is within a predetermined communication area 405, which may be defined as an area within a predetermined distance of each of the one or more location devices 415 (e.g., via Bluetooth™, NFC, Wi-Fi, and/or the like). Such communication connection may be a one-way communication connection in which signals are broadcast from each of the one or more location devices 415 to the user device 110. Such predetermined distance may be established based on the effective communication range of the wireless communication protocol utilized. As a non-limiting example, the user device 110 and each location device 415 may be configured to communicate using a Bluetooth™ Smart communication protocol with an effective communication range of approximately 8 feet, although other communication protocols with other effective ranges may be used. Therefore, the user device 110 and each of the one or more location devices 415 may be configured to establish a communication connection whenever the user device 110 is within the effective communication range of the utilized communication protocol. Alternatively, the size, shape, and location of the communication area 405 may be established based on other factors, such as the distance between sort locations 400, the distance between the intake location 450 and the one or more sort locations 400, and/or the like. The communication area 405 may be defined as an area within a geofenced area, and the user device 110 and the one or more location devices 415 may establish a communication connection after the user device 110 enters the communication area 405. In various embodiments, the user device 110 is configured to maintain a communication connection with a plurality of location devices 415 concurrently.

As a non-limiting example, each sort location 400 may be associated with a plurality of location devices 415 embodied as wireless beacons each configured to broadcast data indicating the identity of the associated sort location. Such location devices 415 may be located proximate to the sort location 400, and may be arranged such that the effective communication range of each of the plurality of the location devices 415 overlaps within the associated sort location 400 to establish the communication area 405. As the user device 110 is moved proximate the sort location, the user device 110 receives the signals broadcast by one or more of the location devices 415 at Block 505. At Block 506 the user device 110 may determine whether the received signals satisfy one or more signal criteria in order to validate the identity of the proximate sort location. For example, the user device 110 may determine whether the signal strength received from each of the one or more location devices 415 satisfies a predetermined signal strength threshold (e.g., the signal strength threshold may define a minimum signal strength). Moreover, the user device 110 may determine whether a signal is received from a minimum number of location devices 415 associated with a particular sort location. As yet another example, the user device 110 may determine whether a signal indicating that the user device is proximate to sort location 400 from at least 3 location devices 415 each broadcasting the identity of the sort location 400. In various embodiments, the user device 110 may determine whether two or more signal criteria are satisfied (e.g., the signal strength threshold and the minimum number of location devices 415). Such criteria may impede false positive determinations that the user device 110 is proximate a particular sort location. For example, as a user approaches a plurality of sort locations, the user device 110 may receive weak signals from at least one location device 415 associated with each of a plurality of sort locations. By ensuring that the signal strength of the signal received from a particular location device 415 satisfies a predetermined threshold, weak signals received from location devices 415 associated with distant sort locations may be disregarded. Moreover, by ensuring that signals are received from a minimum number of location devices 415 associated with a particular sort location, the user device 110 may ensure that it is positioned within or proximate a single sort location, rather than between two or more sort locations. In various embodiments, the user device 110 may be configured to periodically (e.g., every 5 seconds) and/or continuously determine whether the one or more signal criteria are satisfied.

Upon determining that the signals received by the user device 110 satisfy the one or more signal criteria, the user device 110 may transmit the sort location identity data received from the one or more location devices 415 and the asset identity data to the control system 100 at Block 506. The control system 100 may then determine whether the user device 110 is proximate the appropriate sort location for the asset. The control system 100 may be configured to transmit an indication of whether the user device 110 is proximate the appropriate sort location to the user device 110.

Alternatively, after the user device 110 enters the communication area 405, the user device 110 may be configured to transmit the asset identifier to the location devices 415. In various embodiments wherein the asset identifier data comprises data regarding the appropriate sort location for the asset 10, the location devices 415 may be configured to transmit data indicating whether the user device 110, and consequently the user 5 and asset 10, is proximate the appropriate sort location (e.g., within the communication area 405) to the user device 110. In various embodiments, the one or more location devices 415 may be configured to transmit at least a portion of the asset identifier data to the control system 100, which may be configured to determine whether the user device 110 is proximate the appropriate sort location. The control system 100 may be configured to transmit an indication of whether the user device 110 is proximate the appropriate sort location to the one or more location devices 415, which may be configured to transmit an indication of whether the user device is proximate the appropriate sort location to the user device 110. Referring again to FIG. 5, upon a determination that the user device 110 is proximate an incorrect sort location 400 (e.g., within a communication area 405 corresponding to a final delivery vehicle that does not travel to the asset's 10 destination address) at Block 508, at least one of the control system 100 and/or the one or more location devices 415 may be configured to transmit mistake data to the user device 110, and the user device 110 may be configured to receive the mistake data at Block 512. Upon receiving the mistake data, the user device 110 may be configured to generate a mistake message to inform the user 5 (e.g., sort personnel) that the asset 10 is proximate an incorrect sort location 400 at Block 513. Alternatively or additionally, the display 420 may be configured to display a mistake message to inform the user 5 that the asset 10 is proximate to an incorrect sort location 400 at Block 513. As a non-limiting example, the user device 110 may be configured to cause display of a mistake message via the display 114, emit a warning sound, and/or otherwise warn the user 5 that the user device 110 is proximate an incorrect sort location 400. Thus, as a non-limiting example, mistake data may be generated if the user 5 approaches an incorrect sort location and/or enters an incorrect sort location. As indicated at Block 514, the user device 110 may unlink the asset identifier data and the user device 110 such that the asset identifier data is cleared from the memory of the user device 110 such that the asset identifier data is no longer stored in the memory of the user device 110 upon the occurrence of a triggering event. Such triggering event may be, for example, reading, scanning, or otherwise receiving asset identifier data (e.g., via the indicia reader device) while the user device 110 is in the communication area 405, losing connection between one or more location devices 415 and the user device 110 (e.g., upon a determination that the wireless communication connection between the plurality of location devices 415 and the user device 110 no longer satisfy the signal criteria), after receiving asset identifier data regarding a second asset 10, and/or otherwise after a triggering event. In various embodiments, the user device 110 may be configured to reset, or otherwise dissociate the asset identified data from the user device 110 upon the occurrence of a triggering event. Accordingly, in the event that the user device 110 is located proximate an incorrect sort location, the user may be required to rescan the indicia associated with the asset 10 to relink the asset identified data with the user device 110 before transporting the asset 10 to the appropriate sort location.

At Block 515, the user 5 (e.g., sort personnel) may transport the asset 10 out of the communication area 405 corresponding to the incorrect sort location 400, and may transport the asset 10 to the appropriate sort location. After removing the asset 10 (and consequently the user device 110) from the communication area 405 associated with the incorrect sort location 400, and after the user device 110 unlinks the asset identifier data from the user device 110, the process reverts to Block 501. However, in various embodiments, the user device 110 may be configured to associate the asset identifier data with sort location data at Block 515, and the process may end. As a non-limiting example, the user device 110 may be configured to associate the asset identifier data with the sort location identifier data upon the occurrence of a triggering event. Such triggering event may be, for example, reading, scanning, or otherwise receiving asset identifier data (e.g., via the indicia reader device) while the user device 110 is in the communication area 405, losing connection between one or more location devices 415 and the user device 110 (e.g., upon a determination that the wireless communication connection between the plurality of location devices 415 and the user device 110 no longer satisfy the signal criteria), after receiving asset identifier data regarding a second asset 10, and/or otherwise after a triggering event. In various embodiments, the user device 110 may be configured to reset, or otherwise dissociate the asset identifier data from the user device 110 upon the occurrence of a triggering event.

The user device 110 may also or alternatively be configured to reset and/or unlink the asset identifier data after a predetermined amount of time after receiving the mistake data; after scanning, reading, or otherwise receiving the asset identifier data regarding the asset 10 (e.g., via the indicia reader) while the user device 110 is located within the communication area 405, after receiving asset identifier data regarding a second asset 10; and/or otherwise after a triggering event. The user device 110 may be utilized to receive asset identifier data regarding a subsequent asset 10 to be sorted, and the process is repeated.

Referring again to Block 508, the process may proceed after transmission of the asset identifier data and/or sort location identifier data to the one or more location devices 415 and/or control system 100 (illustrated as Block 507) with reference to Blocks 509-511 if the user 5 approaches the appropriate sort location. Upon a determination that the user device 110 is proximate and/or within the appropriate sort location (e.g., within the communication area 405 corresponding to the appropriate sort location), the control system 100 and/or the one or more location devices 415 may be configured to transmit confirmation data to the user device 110 indicating the user device 110 is proximate the appropriate sort location for the asset 10, and the user device 110 may be configured to receive the confirmation data at Block 509. Upon receiving the confirmation data, the user device 110 may be configured to generate a confirmation message to inform the user 5 (e.g., sort personnel) that the asset 10 is near the appropriate sort location 400 at Block 510. Alternatively or additionally, the display 420 may be configured to display a confirmation message to inform the user 5 that the asset 10 is near the appropriate sort location 400 at Block 510. As a non-limiting example, the user device 110 may be configured to cause display of a confirmation message via the display 114, emit a confirmation sound, and/or otherwise provide the user 5 with confirmation that the user device 110 is proximate the appropriate sort location.

In various embodiments, after receiving the confirmation data, the user device 110 may be configured to associate the asset identifier data with a sort location identifier. Alternatively, the asset identifier data may be transmitted to the control system 100, which may be configured to associate the asset identifier data with the sort location data.

After receiving the confirmation data and/or after another triggering event, the user device 110 may be configured to dissociate, unlink, delete, clear, or otherwise remove the asset identifier data regarding the recently sorted asset 10 from the active memory of the user device 110 at Block 511. The user device 110 may be configured to unlink the asset identifier data after the user device 110 determines that the one or more signal criteria are no longer satisfied, after a predetermined amount of time after receiving the confirmation data; after scanning, reading, or otherwise receiving the asset identifier data regarding the asset 10 (e.g., via the indicia reader) while the user device 110 is located within the communication area 405; after receiving asset identifier data regarding a second asset 10; after receiving user input via the user device 110; and/or otherwise after a triggering event. The user device 110 may be utilized to receive asset identifier data regarding a subsequent asset 10 to be sorted, and the process may be repeated.

The user device 110 may have any of a variety of configurations. For example, the user device 110 may not transmit or receive data (e.g., asset identifier data) from the control system 100, and may instead only transmit and receive data from one or more location devices 415. Moreover, the user device 110 may not generate and/or display appropriate sort location data, and instead the user 5 (e.g., sort personnel) may be required to ascertain the appropriate sort location for an asset 10 without a reminder or other indication from the user device 110. Alternatively, the appropriate sort location may be printed on the asset 10 in human readable form such that the user 5 (e.g., sort personnel) may determine the appropriate sort location based on information printed on or otherwise physically associated with the asset 10.

As yet another alternative, the user device 110 need not establish a new connection with one or more proximate location devices 415 each time the user device enters a connection area 405. In various embodiments, the user device 110 may maintain connections with each of the plurality of location devices 415 associated with each of the plurality of sort locations 400. Upon a determination that the user device 110 enters the connection area 405, the user device may be configured to transmit asset identifier data to the one or more location devices 415 associated with the connection area, and/or the user device 110 may be configured to transmit the asset identifier data and sort location identified data indicative of the identity of the proximate sort location to the control system 100. For example, such determination may be made based at least in part on the location of the user device 110 relative to a geofence surrounding the sort location and/or one or more location devices 415, the communication signal strength, and/or the like. Thus, although the user device 110 may maintain active connections with each of the plurality of location devices 415, the various system components (e.g., the user device 110, the one or more location devices 415, and/or the control system 100) may be configured to determine the appropriate one or more location devices 415 to receive asset identifier data from the user device 110 based at least in part on the location of the user device.

In various embodiments, the user device 110 may be configured to associate the asset identifier data and the location data prior to a determination whether the first sort location 400 is the appropriate sort location for the asset 10. Alternatively, the user device 110 may be configured to associate the asset identifier data and the location data without determining whether the first sort location 400 is the appropriate sort location for the asset 10. In these and other embodiments, the user device 110 may be configured to receive location data from one or more location devices 415 regarding the associated sort location 400 after entering the associated communication area 405. After receiving the location data from the one or more location devices 415, the user device 110 may be configured to associate the location data and the asset identifier data. In various embodiments, the user device 110 may be configured to transmit the associated location data and asset identifier data to one or more databases for storage. Alternatively, the user device 110 may be configured to transmit an indication regarding the association between the asset identifier data and the location data to a control system 100, which may be configured to update data stored in one or more associated databases to reflect the association between the asset identifier data and the location data.

The user device 110 may be further configured to generate one or more alerts regarding the association between the asset identifier data and the location data. The user device 110 may be configured to generate an alert to inform the user 5 (e.g., sort personnel) or other users regarding asset identifier data being associated with location data. As a non-limiting example, the user device 110 may be configured to cause a message to be displayed in order to notify the user 5 that asset identifier data corresponding to an asset 10 has been associated with location data corresponding to a sort location. Thus, the user device 110 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

B. Exemplary Location Device Operation

In various embodiments, each sort location may be associated with a plurality of location devices 415 embodied as wireless beacons each configured to broadcast data indicative of the identity of the associated sort location 400 such that the user device 110 may receive such broadcast data. Accordingly, each location device 415 may be configured to establish a one-way communication connection with a user device 110 such that each of the location devices 415 may transmit data, but not receive data from the user device 110. For example, each location device 415 may be configured to transmit data indicative of the identity of the sort location 400 to the user device 110 upon the user device entering the broadcast area of the location device 415. The user device 110 may then be configured to transmit the sort location identity data and/or the asset identity data indicative of the identity of the asset being transported by the user to the control system 100 for additional processing.

Figure 11:
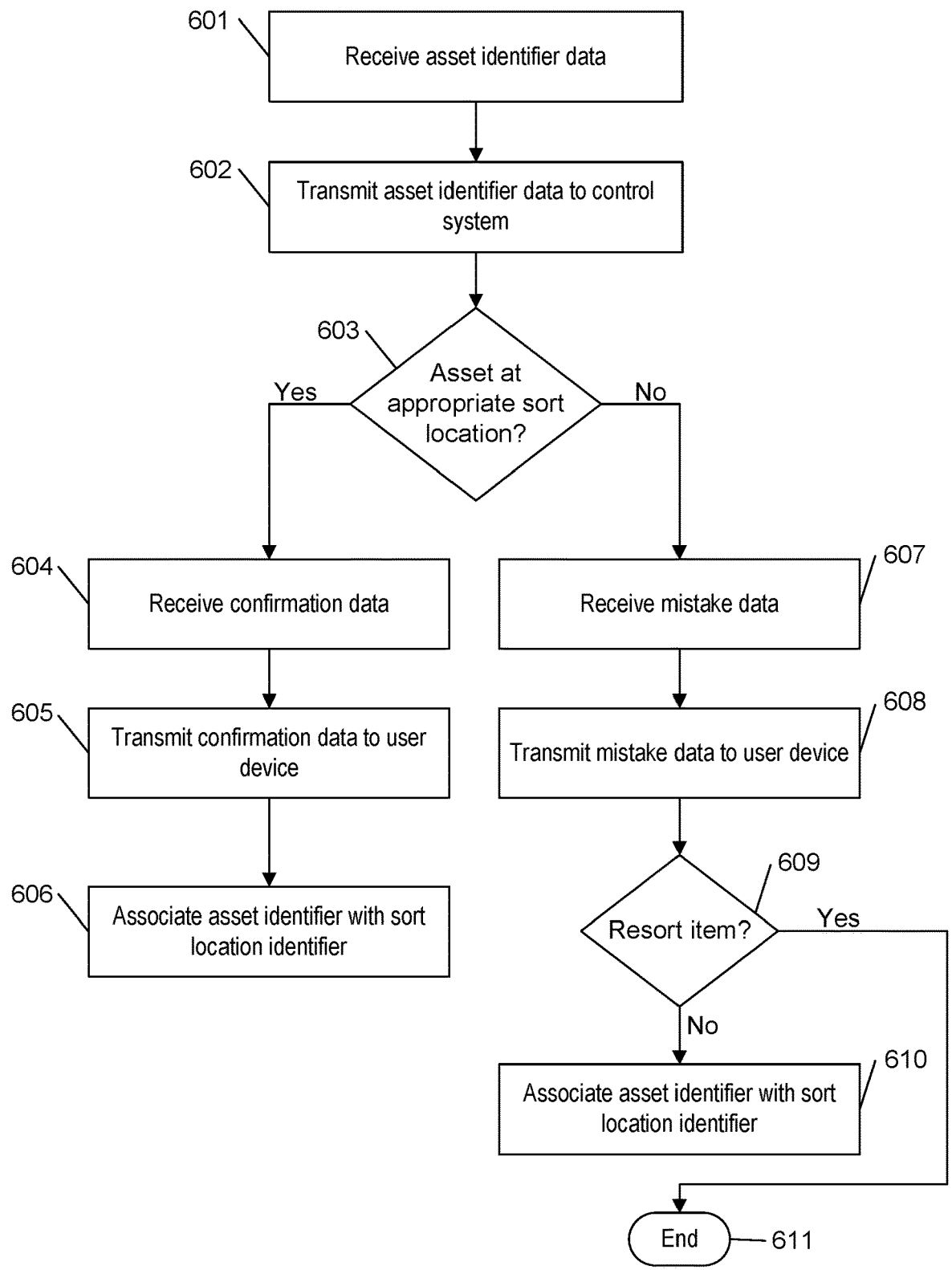
FIG. 11 schematically depicts a flowchart illustrating operations and processes performed by the location device of FIG. 1 according to one or more embodiments shown and described herein.

Alternatively, each location device 415 may be configured to transmit and/or receive data from the user device 110 and/or the control system 100. FIG. 11 illustrates exemplary steps carried out by a location device 415 according to various embodiments of the present invention. As illustrated in FIG. 11, each location device 415 may receive asset identifier data at Block 601. The asset identifier data may be transmitted to one or more location devices 415 from a user device 110. As previously described, the asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. As described above, the asset identifier data may additionally include indications designating an asset 10 for special or expedited handling. Moreover, in various embodiments, the asset identifier data may comprise more detailed data regarding the asset 10 to be sorted, such as sort locations 400 for each intermediate shipping point between the origin and destination of the asset 10. In various embodiments, the asset identifier data may be updated at various times during the shipping process. For example, after determining an appropriate sort location for the asset 10 to be sorted (a process described in greater detail herein), the asset identifier data may be updated to reflect the appropriate sort location. Alternatively, the asset identifier data may be fixed after being created, such that it is not updated with new and/or alternative information during shipment.

In various embodiments, each location device 415 may be configured to receive asset identifier data from a user device 110 after establishing a communication connection with the user device 110. In various embodiments, a connection (e.g., a two-way communication connection) between the location device 415 and the user device 110 may only be established upon the user device 110 entering the communication area 405 associated with the location device 415. As a non-limiting example, the size, shape, and location of the communication area 405 may be based on any number of factors, such as, for example, the effective communication range of the communication protocol utilized. Alternatively or additionally, the size, shape, and location of the communication area 405 may be based on other factors, such as the distance between sort locations 400, and/or the distance between the intake location 450 (e.g., an unsorted location) and the sort locations 400. As previously noted, the location device 415 may be configured to initiate a connection with a user device 110 only after the user device enters the predetermined communication area 405 defined by, for example, a geofence.

In various embodiments, the location device 415 may be configured to transmit at least a portion of the received asset identifier data to the control system 100 at Block 602. The control system 100 may be configured to determine the appropriate sort location for the asset 10 based at least in part on the asset identifier information received from the location device 415. Alternatively, the location device 415 may be configured to determine whether the sort location 400 associated with the location device is the appropriate sort location for the asset 10. As a non-limiting example, where the asset identifier data comprises data indicating an appropriate sort location, the location device 415 may be configured to compare the appropriate sort location indicated by the asset identifier data and the sort location 400 associated with the location device 415 to determine whether there is a match. As indicated at Block 603, the remaining steps to be completed may be selected based at least in part on a determination of whether the location device 415 corresponds to the appropriate sort location 400.

Upon a determination that the sort location 400 associated with the location device 415 is not the determined appropriate sort location, the location device is configured to receive mistake data at Block 607. As indicated herein, the mistake data may indicate that the user device 110 is proximate the incorrect sort location 400. Alternatively, the location device 415 may be configured to generate mistake data based upon a determination that the user device 110 is proximate an incorrect sort location 400 for the asset 10.

At Block 608, the location device 415 may be configured to transmit the mistake data to the user device 110. As indicated herein, the user device 110 may be configured to generate an indication discernible by the user 5 that the proximate sort location 400 (i.e., the sort location associated with the location device 415) is not the determined appropriate sort location for the asset 10. The user 5 (e.g., sort personnel) may then continue transporting the asset 10 (and consequently the user device 110) to another sort location 400 at Block 609, and the process ends at Block 611. In various embodiments, the process may begin again for a second (or subsequent) set of one or more location devices 415 upon the user device 110 entering a second (or subsequent) communication area 405 associated with the second set of one or more location devices 415. Alternatively, the user 5 (e.g., sort personnel) may deposit the asset 10 at the sort location 400 associated with the location device 415, and the location device may associate the asset identifier data with sort location identifier data at Block 610. As a non-limiting example, the location device 415 may associate the asset identifier data with the sort location identifier data upon the occurrence of a triggering event. As non-limiting examples, such triggering event may include determining that the communication signal between the user device 110 and the one or more location devices 415 does not satisfy the signal criteria; receiving asset identifier data from the user device 110 while the user device is located within the communication area 405; determining that the user device 110 remains in the communication area 405 for a predetermined amount of time; receiving user input (e.g., pressing a specific key on the user device 110); and/or the like.

Referring again to Block 603, the process may proceed after transmission of the asset identifier data to the control system 100 (illustrated as Block 602) with reference to Blocks 604-606 if the user 5 approaches the appropriate sort location. Upon a determination that the sort location 400 associated with the location device 415 is the appropriate sort location, the location device may be configured to receive confirmation data at Block 604. As indicated herein, the confirmation data may indicate that the user device 110 is proximate the appropriate sort location. Alternatively, the location device 415 may be configured to generate confirmation data based upon a determination that the user device 110 is proximate the appropriate sort location for the asset 10.

At Block 605, the location device 415 may be configured to transmit the confirmation data to the user device 110 and/or the display 420. As indicated herein, the user device 110 and/or the display 420 may be configured to generate an indication discernible by the user 5 that the proximate sort location 400 (i.e., the sort location 400 associated with the location device 415) is the determined appropriate sort location for the asset 10. The user 5 (e.g., sort personnel) may then deposit the asset 10 at the appropriate sort location. At Block 606, the location device 415 may associate the asset identifier data with sort location identifier data upon the occurrence of a triggering event. As non-limiting examples, the triggering event may be the expiration of a predetermined amount of time after receiving or generating confirmation data, the reception of asset identifier data while the user device 110 is within the communication area 405, the reception of user input via the user device 110, and/or the like.

The location device 415 may have any of a variety of different configurations. As a non-limiting example, the location device 415 may not transmit or receive data (e.g., asset identifier data and/or data identifying the appropriate sort location) from the control system 100. Instead, the location device 415 may be configured to communicate (e.g., broadcast) the identity of the sort location 400 associated with the location device to the user device 110, and the user device 110 and/or the control system 100 may be configured to determine whether the sort location 400 is the appropriate sort location. Moreover, the location device 415 may not be configured to associate asset identifier data with sort location identifier data. In various embodiments, the location device 415 may be configured to only transmit indications to the user device 110 upon a determination that the user device 110 is proximate an incorrect sort location 400. As yet another alternative, the location device 415 may be configured to provide indications directly to the user 5 regarding whether the associated sort location 400 is the appropriate sort location. As a non-limiting example, the location device 415 may cause a sound to be emitted from an associated output device, or may cause a light to be illuminated based on the determination of whether the associated sort location 400 is the appropriate sort location for the asset 10.

In various embodiments, the location device 415 may be configured to associate the asset identifier data and the location data prior to a determination whether the first sort location 400 is the appropriate sort location for the asset 10. Alternatively, the location device 415 may be configured to associate the asset identifier data and the location data without determining whether the first sort location 400 is the appropriate sort location for the asset 10. In these and other embodiments, the location device 415 may be configured to receive asset identifier data from a user device 110 regarding an asset after the user device 110 enters the communication area 405 associated with the location device 415. After receiving the asset identifier data from the user device 110, the location device 415 may be configured to associate the location data and the asset identifier data. In various embodiments, the location device 415 may be configured to transmit the associated location data and asset identifier data to one or more databases for storage. Alternatively, the location device 415 may be configured to transmit an indication regarding the association between the asset identifier data and the location data to a control system 100, which may be configured to update data stored in one or more associated databases to reflect the association between the asset identifier data and the location data.

The location device 415 may be further configured to generate one or more alerts regarding the association between the asset identifier data and the location data. The location device 415 may be configured to generate an alert to inform the user 5 (e.g., sort personnel) or other users regarding asset identifier data being associated with location data. As a non-limiting example, the location device 415 may be configured to cause a message to be displayed via the user device 110 and/or the display 420 in order to notify the user 5 that asset identifier data corresponding to an asset 10 has been associated with location data corresponding to a sort location. Thus, the location device 415 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

C. Exemplary Control System Operation

Figure 12:
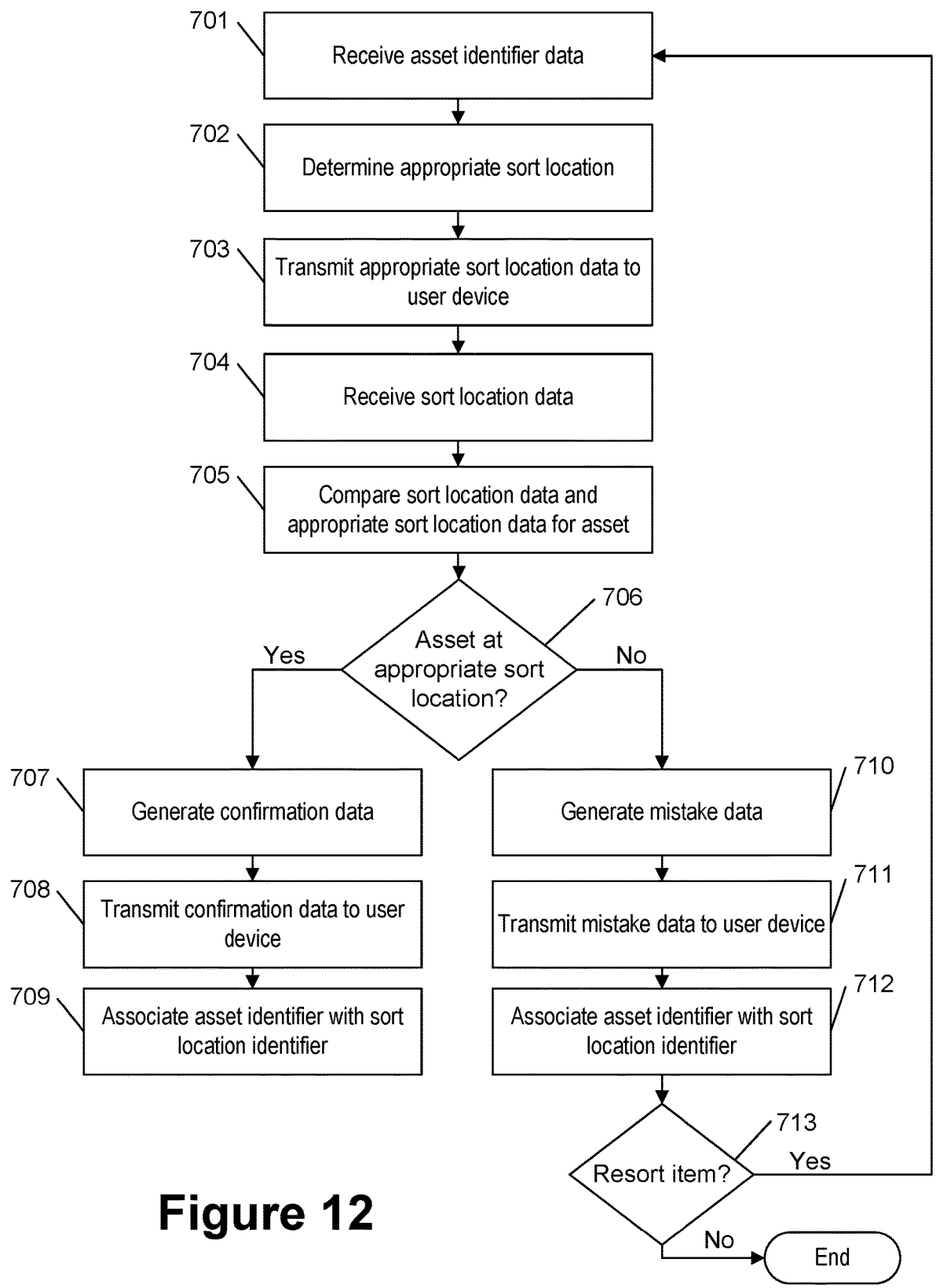
FIG. 12 schematically depicts a flowchart illustrating operations and processes performed by the control system of FIG. 1 according to one or more embodiments shown and described herein.

FIG. 12 illustrates exemplary steps carried out by the control system 100 according to various embodiments of the present invention. As illustrated in FIG. 12, the control system 100 may receive asset identifier data at Block 701. As indicated herein, the asset indicator data may be received from the user device 110 and/or the one or more location devices 415.

The asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. As described above, the asset identifier data may additionally include indications designating an asset 10 for special or expedited handling. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location for the asset 10 to be sorted (a process described in greater detail herein), the asset identifier data may be updated to reflect the appropriate sort location. Alternatively, the asset identifier data may be fixed after being created, such that it is not updated with new and/or alternative information during shipment.

At Block 702, the control system 100 may be configured to determine the appropriate sort location 400 for the asset 10 and/or the appropriate position within the sort location for the asset 10. In various embodiments, the determination of the appropriate sort location for the asset 10 may be based at least in part on the received asset identifier data. Moreover, the control system 100 may utilize sort location data corresponding to each of the sort locations 400 to determine whether any subsequent processing to be performed on assets 10 at each sort location 400 will move the asset 10 closer to its final destination. As a non-limiting example, the control system 100 may determine the appropriate sort location for an asset 10 to be delivered to 123 Main Street, Atlanta, Georgia is the delivery vehicle that will deliver other assets 10 to 123 Main Street, Atlanta, Ga. As a second non-limiting example, the control system 100 may determine the appropriate sort location for an asset 10 to be delivered to 345 Broad Street, Los Angeles, Calif. via Next Day Delivery is a pallet to be loaded onto a plane destined for Los Angeles, Calif. As yet another alternative, the control system 100 may be configured to identify a sort location 400 previously assigned to the asset 10.

Referring again to FIG. 12, at Block 703 the control system 100 may be configured to transmit data identifying the appropriate sort location to the user device 110. As noted herein, the user device 110 and/or the display 420 may be configured to generate an indication discernible by the user 5 (e.g., sort personnel) regarding the appropriate sort location for the asset 10. However, as noted herein, each asset 10 may have information indicative of an appropriate sort location printed thereon, and accordingly the control system 100 may not transmit appropriate sort location data to the user device 110 and/or the display 420 for display to the user 5.

The control system 100 may be configured to receive sort location data from the user device 110 and/or the location device 415 upon the user device entering the communication area 405 corresponding to the location device 415 at Block 704. At Block 705, the control system 100 may subsequently compare the appropriate sort location and the sort location data received at Block 704 to determine whether the user device 110 is proximate the appropriate sort location. As indicated at Block 706, the remaining steps to be completed may be selected based at least in part on a determination of whether the location device 415 corresponds to the appropriate sort location.

Upon a determination that the user device 110 is proximate an incorrect sort location 400, the control system 100 may generate mistake data at Block 710. Upon generating the mistake data, the control system 100 may transmit the mistake data to the user device 110, the display 420, and/or the location device 415 at Block 711. As indicated herein, the user device 110, the display 420, and/or the location device 415 may be configured to generate a message discernible by the user 5 (e.g., sort personnel) indicating the user device 110 is proximate an incorrect sort location 400. In various embodiments, the control system 100 may be configured to associate the asset identifier data with the sort location data corresponding to the sort location 400 at Block 712. In various embodiments, the control system 100 may be configured to associate the asset identifier data with the sort location data upon the occurrence of a triggering event. Exemplary triggering event may comprise, reading, scanning, or otherwise receiving asset identifier data (e.g., via the indicia reader device) while the user device 110 is in the communication area 405, receiving asset identifier data regarding a second asset 10, receiving user input via the user device 110, and/or the like.

At Block 713, the user 5 may continue transporting the asset 10 (and consequently the user device 110) to another sort location 400. The process may return to Block 701 and repeat the recited steps. In various embodiments, the user may be required to rescan the indicia of the asset with the user device 110, and accordingly the control system 100 may receive the asset identifier data from the user device 110 as illustrated in Block 701. Alternatively, the user 5 (e.g., sort personnel) may deposit the asset 10 at the incorrect sort location 400, and process may end.

Referring again to Block 706, the process may proceed after comparing the sort location data and the appropriate sort location data for the asset 10 (illustrated as Block 705) with reference to Blocks 707-709 if the user 5 approaches the appropriate sort location. Upon a determination that the user device 110 is proximate the appropriate sort location, the control system 100 may be configured to generate confirmation data at Block 707. The control system 100 may be configured to then transmit the confirmation data to user device 110 and/or the location device 415 at Block 708. As indicated herein, the user device 110, the display 420, and/or the location device 415 may generate a message discernible by the user 5 (e.g., sort personnel) indicating that the user device 110 is proximate the appropriate sort location for the asset 10.

At Block 708, the control system 100 may be configured to associate the asset identifier data with the sort location data corresponding to the sort location 400. In various embodiments, the control system 100 may be configured to associate the asset identifier data with the sort location data upon the occurrence of a triggering event. Such triggering event may be, for example, a determination that the user device 110 is no longer in communication with the one or more location devices 415 (e.g., upon a determination that the communication connection between the user device 110 and one or more location devices 415 does not meet the signal criteria), reading, scanning, or otherwise receiving asset identifier data (e.g., via the indicia reader device) while the user device 110 is in the communication area 405, after receiving asset identifier data regarding a second asset 10, and/or otherwise after a triggering event.

In various embodiments, the control system 100 may be configured to associate the asset identifier data and the location data prior to a determination whether the first sort location 400 is the appropriate sort location for the asset 10. Alternatively, the control system 100 may be configured to associate the asset identifier data and the location data without determining whether the first sort location 400 is the appropriate sort location for the asset 10. In these and other embodiments, the control system 100 may be configured to receive asset identifier data and location data from a location device 415 and/or a user device 110. After receiving the asset identifier data and the location data, the control system 100 may be configured to associate the location data and the asset identifier data. In various embodiments, the control system 100 may be configured to transmit the associated location data and asset identifier data to one or more databases for storage.

The control system 100 may be further configured to generate one or more alerts regarding the association between the asset identifier data and the location data. The control system 100 may be configured to generate an alert to inform the user 5 (e.g., sort personnel) or other users regarding asset identifier data being associated with location data. As a non-limiting example, the control system 100 may be configured to cause a message to be displayed via the user device 110 in order to notify the user 5 that asset identifier data corresponding to an asset 10 has been associated with location data corresponding to a sort location. Thus, the control system 100 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

VI. EXEMPLARY USE

Referring again to FIG. 8, shown is a schematic of an example sort facility in which assets 10 are moved by a user 5 (e.g., sort personnel) from an intake location 450 (e.g., a conveyor belt moving unsorted assets 10 into the sort facility) to one of a plurality of sort locations 400.

As shown in FIG. 8, a user 5 may remove an asset 10 from an intake location 450 and scan, read, or otherwise obtain an asset indicia from the asset 10 using the user device 110. The user device 110 may receive and store asset identifier data based at least in part on the information received from the asset indicia. The user 5 may then transport (e.g., carry) the asset 10 and the user device 110 away from the intake location 450 and to one of the plurality of sort locations 400. As the user 5 nears a sort location 400, and thus enters the communication area 405, the user device 110 may receive sort location identifier data from one or more location devices 415 associated with the proximate sort location 400 (illustrated by the dashed line connecting the user device 110 and location device 415 in FIG. 4). Upon receipt of sort location identifier data from one or more location devices 415, the user device 110 may determine whether the signals received from the one or more location devices 415 satisfy signal criteria. For example, the user device 110 may determine whether the signal received from each of the plurality of location devices 415 satisfies a predetermined signal strength threshold and/or may determine whether wireless signals are received from at least a minimum number of location devices 415 broadcasting data regarding a single sort location. Upon a determination that the signal received from the plurality of location devices 415 satisfies each of the signal criteria, the user device 110 may transmit asset identity data and sort location identity data to the control system 100 to determine whether the user device 110 is proximate the appropriate sort location for the asset.

Alternatively, upon entering the communication area 405, the user device 110 may transmit the stored asset identifier data to the one or more location devices 415 (illustrated by the dashed line connecting the user device 110 and location device 415 in FIG. 4). As yet another alternative, at least one of the user device 110 or the location device 415 may transmit asset identifier data and/or location data to the control system 100 (illustrated by the dashed lines connecting the user device 110 to the control system 100 and location device 415 to the control system in FIG. 3). At least one device (e.g., the user device 110, location device 415, and/or the control system 100) may determine the appropriate sort location for the asset 10, and may compare the sort location identifier data corresponding to the proximate sort location 400 and the appropriate sort location. Upon a determination that the proximate sort location 400 is not the appropriate sort location, the user device 110 and/or the location device 415 may be configured to generate an alert to notify the user 5 that the asset 10 should not be placed at the proximate sort location 400.

Upon a determination that the proximate sort location 400 is the appropriate sort location, the user device 110 and/or the location device 415 may be configured to generate an alert to notify the user 5 that the asset 10 should be placed at the proximate sort location 400. The user device 110 may then be configured to await a triggering event before preparing to receive asset identifier data regarding a second asset 10 to be sorted. As a non-limiting example, the triggering event may be a determination by the user device 110 that the communication signal between the user device 110 and the one or more location devices 415 no longer satisfies the signal criteria. As another example, the user 5 may scan, read, or otherwise obtain the asset indicia for the asset 10 while the user device 110 remains in the connection area 405, and/or may supply a user input via the user device 110. Alternatively, the triggering event may be the expiration of a predefined period of time after the user device 110 receives data indicating that the proximate sort location 400 is the appropriate sort location for the asset 10. As yet another example triggering event, the user device 110 may be configured to prepare to receive asset identifier data regarding a second asset 10 only after scanning, reading, or otherwise obtaining an asset indicia corresponding to the second asset 10. In various embodiments, the user device 110 may be configured to clear the asset identifier data regarding the asset 10 from the user device memory upon the occurrence of the triggering event.

Moreover, in various embodiments, at least one device (e.g., the user device 110, the location device 415, and/or the control system 100) may be configured to associate the location data and the asset identifier data. After the user device 110 enters the communication area 405, the at least one device may be configured to associate the location data corresponding to the sort location associated with the communication area 405 with the asset identifier data corresponding to the asset 10 linked or associated with the user device 110. In various embodiments, the at least one device may be configured to associate the location data and the asset identifier data upon the occurrence of a triggering event. Additionally or alternatively, the at least one device may be configured to associate the location data and the asset identifier data after determining that the proximate sort location 400 (e.g., the sort location corresponding to the communication area 405 in which the user device 110 is present) is the appropriate sort location for the asset 10.

After depositing the asset 10 at a sort location 400, the user 5 may return to the intake location 450 with the user device 110 and begin the above described method for a second asset 10 to be sorted.

V. CONCLUSION

Many modifications and other embodiments of the inventions set forth herein will come to mind to one skilled in the art to which these inventions pertain having the benefit of the teachings presented in the foregoing descriptions and the associated drawings. For example, various embodiments may be configured to associate a plurality of assets with a particular sort location. In such embodiments, a sort employee may scan a plurality of asset identifiers (e.g., sequentially) before transporting the plurality of items to a sort location. Thereafter, the plurality of assets may be associated with the proximate sort location according to the features and methods described herein. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a user device comprising one or memory storage areas and one or more processors, the user device configured to:
receive asset identifier data from an asset indicia, wherein the asset indicia is associated with an asset;
store the asset identifier data corresponding to the asset;
based at least in part on being brought within a communication area associated with a sort location, receive at least a portion of transmitted location data from one or more location devices, the one or more location devices being associated with the sort location;
subsequent to the receiving of the portion of transmitted location data from the one or more location devices, transmit the asset identifier data and the portion of transmitted location data; and
provide an indication of an appropriate sort location based on the asset identifier data, wherein the indication of the appropriate sort location is superimposed over the asset in a display.

2. The system of claim 1, further comprising a control system operatively connected to at least the user device, the control system comprising:
a control system memory; and
one or more control system computer processors configured to:
receive the asset identifier data and the portion of transmitted location data; and
determine, based at least in part on the asset identifier data and the portion of transmitted location data, whether the sort location is the appropriate sort location for the asset.

3. The system of claim 2, wherein the user device is further configured to:

based on a determination that the sort location is not the appropriate sort location for the asset, receive, from the control system, mistake data indicative of the determination that the sort location is not the appropriate sort location or receive, from the control system, confirmation data.

4. The system of claim 3, wherein the user device is further configured to receive, from the control system, an alert indicating that the sort location is not the appropriate sort location upon the determination that the sort location is not the appropriate sort location.

5. The system of claim 2, wherein the user device is further configured to receive, from the control system, an indication of an appropriate position for the asset within the appropriate sort location.

6. The system of claim 5, wherein the user device is further configured to generate a visual indicator to provide a visual indication of the appropriate position for the asset within the appropriate sort location.

7. The system of claim 1, wherein the user device is further configured to receive, from a control system, an alert indicating that the sort location is the appropriate sort location upon a determination that the sort location is the appropriate sort location.

8. The system of claim 1, wherein the user device comprises glasses comprising a see-through display.

9. The system of claim 1, wherein the user device further comprises an asset indicia reader configured to receive information from one or more tags associated with the asset.

10. A computer-implemented method comprising:
receiving, by a user device, asset identifier data from asset indicia, wherein the asset indicia is associated with an asset;
based at least in part on the user device being brought within a communication area associated with a sort location, receiving, by the user device, location data associated with one or more location devices; and
based at least in part on the receiving of the location data and the receiving of the asset identifier data, generating, by the user device, an indication of an appropriate sort location, wherein the indication of the appropriate sort location is superimposed over the asset in a display.

11. The method of claim 10, further comprising:
receiving, by the user device, a second indication of whether the sort location is the appropriate sort location for the asset.

12. The method of claim 11, further comprising:
based at least in part on a determination that the sort location is not the appropriate sort location for the asset, receiving, by the user device, mistake data indicative of the determination; and
based at least in part on a determination that the sort location is the appropriate sort location for the asset, receiving, by the user device, confirmation data indicative of the determination that the sort location is the appropriate sort location.

13. The method of claim 10, further comprising receive receiving, by the user device, an alert indicating that the sort location is not the appropriate sort location based on a determination that the sort location is not the appropriate sort location.

14. The method of claim 10, further comprising generating, by the user device, a visual indicator indicating that the sort location is the appropriate sort location, the visual indicator indicative of a light located near the sort location illuminating.

15. The method of claim 14, further comprising providing, by the user device, a visual indication of an appropriate position for the asset within the appropriate sort location by illuminating the visual indicator.

16. The method of claim 10, further comprising receiving, by the user device, a second indication of an appropriate position for the asset within the appropriate sort location.

17. The method of claim 10, wherein the user device comprises two display devices, one of which is associated with each eye of a user to enable a three-dimensional viewing environment at the user device.

18. The method of claim 10, wherein the user device further comprises an RFID reader configured to receive information from one or more tags indicating an identify of the asset.

19. A system comprising:
a user device comprising one or memory storage areas and one or more processors, the user device configured to:
receive asset identifier data from asset indicia, wherein the asset indicia is associated with an asset;
based at least in part on the user device being brought within a communication area associated with a sort location, receive location data associated with one or more location devices; and
based at least in part on the receiving of the location data and the receiving of the asset identifier data, generate an indication of an appropriate sort location, wherein the indication of the appropriate sort location is superimposed over the asset in a display.

20. The system of claim 19, wherein the user device comprises glasses comprising a see-through display.

* * * * *